United States Patent [19]
Lungren et al.

[11] Patent Number: 6,092,050
[45] Date of Patent: Jul. 18, 2000

[54] GRAPHICAL COMPUTER SYSTEM AND METHOD FOR FINANCIAL ESTIMATING AND PROJECT MANAGEMENT

[75] Inventors: Grant P. Lungren, Phoenix; R. Stanley Marks, Scottsdale, both of Ariz.

[73] Assignee: Hard Dollar Corporation, Tempe, Ariz.

[21] Appl. No.: 09/036,866

[22] Filed: Mar. 9, 1998

[51] Int. Cl.[7] .................................................... G06F 17/60
[52] U.S. Cl. ................... 705/10; 705/1; 705/27; 705/35; 705/4; 705/36
[58] Field of Search .................. 705/1, 10, 27, 705/35, 4, 36

[56] References Cited

U.S. PATENT DOCUMENTS

| | | | |
|---|---|---|---|
| 4,852,047 | 7/1989 | Lavallee et al. | 700/86 |
| 5,189,606 | 2/1993 | Burns et al. | 705/10 |
| 5,249,120 | 9/1993 | Foley | 705/1 |
| 5,301,336 | 4/1994 | Kodosky et al. | 345/348 |
| 5,454,371 | 10/1995 | Fenster et al. | 600/443 |
| 5,490,246 | 2/1996 | Brotsky et al. | 345/342 |
| 5,513,356 | 4/1996 | Takahashi et al. | 395/710 |
| 5,523,942 | 6/1996 | Tyler et al. | 705/4 |
| 5,570,291 | 10/1996 | Dudle et al. | 700/95 |
| 5,615,367 | 3/1997 | Bennett et al. | 707/102 |
| 5,691,927 | 11/1997 | Gump | 708/131 |
| 5,774,878 | 6/1998 | Marshall | 705/35 |

OTHER PUBLICATIONS

Microsoft Works: Ten Minutes to Productivity, Microsoft Corporation, 1989.
Constructing Your Personal Financial Pyramid (Abstr), Wealthbuilding, vol. 5, No. 5, May 1983.
"Product Information for SmartWare Plus," Angoss Knowledge Engineering, article downloaded from Internet Web page Dec. 18, 1997.

*Primary Examiner*—Emanuel Todd Voeltz
*Assistant Examiner*—George D. Morgan
*Attorney, Agent, or Firm*—Quarles & Brady LLP

[57] ABSTRACT

A computer system and method for preparing financial estimates and for analyzing and using data in the management of projects, includes a graphical user interface (8) with two optional, graphical modes of operation. In one graphical mode of operation, the user directs the computer (10) to display a data map (31) in the form of a segmented pyramid. The segments (34, 35 et seq.) of the pyramid provide active areas or buttons, which when selected with the mouse input device (15), display an appropriate screen with the text or financial details for that segment of the estimating or management process. In an alternative graphical mode of operation, a series of objects in the form of process blocks (75, 78) are connected in a flow chart which proceeds from left to right along a path (73) that is displayed on the screen of the computer. The process blocks (75, 78) each have their own title bar (76) and sequence number (71) to assist the user in following a predetermined sequence in preparing a financial estimate. The user can activate either of these data maps by selecting an appropriate button (26, 28) provided in a button bar (25) incorporating specialized application icons (27, 28). After completing the input of data into the appropriate forms accessed through the screen displays, the user can output a finished report with the bid or proposal, with a schedule of work and other useful reports in managing projects.

18 Claims, 34 Drawing Sheets

FIG. 5

| | | | | | Job Management & Equipment | |
|---|---|---|---|---|---|---|
| | | | | | Cost | Total Cost |
| Code | Description | Account | Days | Qty | Per Day | 43600.00 |
| LSPE | PROJECT ENGINEER | 800-MISC | 100 | 1.00 | 120.00 | 12000.00 |
| LSPM | PROJECT MANAGER | 800-MISC | 50 | 1.00 | 200.00 | 10000.00 |
| LSSEC | SECRETARY | 800-MISC | 100 | 1.00 | 56.00 | 5600.00 |
| LSSUPT | PROJECT SUPERINTENDENT | 800-MISC | 100 | 1.00 | 160.00 | 16000.00 | msE · cn1 · EXAMPLE ESTIMATE        CHIEF · p0 · E95 . 30 · c3 01/09/96

JOB MANAGEMENT: Establish management and equipment for the Job as a whole

FIG. 6 msE · cn1 · EXAMPLE ESTIMATE        CHIEF · p0 · E95 . 30 · c3 01/09/96

| | | Work Plan % ADD-ON | |
|---|---|---|---|
| | <Tab> | Summary | Total Amount |
| Description | Account Number | Addon Amount | 17561.67 |
| SMALL TOOLS ALLOWANCE @ 2% LAB | 800-MISC | 10035.24 | |
| INSURANCE SURCHARGE @ 1.5% LAB | 800-MISC | 7526.43 | |

Modify Blank Combine Worksheet Print Jump
>  Modify current form entries

FIG. 7

| msE · cn1 · EXAMPLE ESTIMATE | | | | CHIEF · p0 · E95 . 30 . c3 01/09/96 | | | | |
|---|---|---|---|---|---|---|---|---|
| | | | | | | | Escalation | |
| Cost Category | Cost | %Esc | Amount | Date Range From To | %Esc | EscCost | % |
| DIRECT COSTS | | | | | | | | |
| Labor Base | 371948 | 5.59 | 20798 | 1/1/1995 12/31/1899 Cmpst<< | | 392746 | 20 |
| Labor Burden | 129813 | 0.00<< | 0 | | | 129813 | 7 |
| Equip Ownership | 219188 | 0.00<< | 0 | | | 219188 | 11 |
| Equip Operating | 127301 | 0.00<< | 0 | | | 127301 | 6 |
| Rentals/Sm Tool | 42239 | 0.00<< | 0 | | | 42239 | 2 |
| Materials | 779413 | -5.00<< | -38971 | | | 740442 | 37 |
| Supplies | 31925 | 0.00<< | 0 | | | 31925 | 2 |
| Subcontracts | 132450 | 0.00<< | 0 | | | 132450 | 7 |
| commentary | 59280 | 0.00<< | 0 | | | 59280 | 3 |
| Tax on R-M-S-O | 44471 | 0.00<< | 0 | | | 44471 | 2 |
| Subtotal | 1938028 | -0.94 | -18173 | | | 1919855 | 97 |
| OVERHEAD COSTS | | | | | | | | |
| Labor Base | 56658 | 0.00<< | 0 | | | 56658 | 3 |
| Labor Burden | 4543 | 0.00<< | 0 | | | 4543 | 0 |
| Equip Ownership | 0 | 0.00 | 0 | | | 0 | 0 |
| Equip Operating | 0 | 0.00 | 0 | | | 0 | 0 |
| Rentals/Sm Tool | 2800 | 10.00<< | 280 | | | 3080 | 0 |
| Materials | 79 | 0.00<< | 0 | | | 79 | 0 |
| Supplies | 20 | 0.00<< | 0 | | | 20 | 0 |
| Subcontracts | 5000 | 0.00 | 0 | | | 5000 | 0 |
| commentary | 0 | 0.00 | 0 | | | 0 | 0 |
| Tax RMSO/Fees | 0 | 0.00 | 0 | | | 0 | 0 |
| Subtotal | 69099 | 0.41 | 280 | | | 69379 | 3 |
| Total Escalation | | -0.89 | -17893 | | Total | 1989235 | 100 |

Modify Print Jump

> Modify Form's current data

FIG. 8

| msE·cn1·EOS·PRODUCT EXAMPLE– STAYOUT | | CHIEF · p0 · E95 . 30 · c3 01/09/96 | | | | |
|---|---|---|---|---|---|---|
| | | | Quote Comparison | | | |
| | Awardee | | Price | Spl | Lic Bnd | Ins |
| InBid: | Example Vendor 1 | | 47.250 | N | N Y | N |
| Session: | Example Vendor 1 | | 47.250 | N | N Y | N |
| Highlight: | Training Data: Subcontractor 5 MB | | | N | N Y | N |
| Line Item: | M2500PS1 | Company: | ZSUB5-M | ZUEN3 | ZUEN5-M | |
| Forecast Qty: | 1.00 | Quote Reference: | 03-CONCR | HAUL | MINAGG | |
| UM: | CY | Quoted: | 10000 | 175000 | 169575 | |
| QuoteGroup: | PCC | Adjusted: | 10500 | 175000 | 170054 | |
| | | Comparison: | 302487 | 320585 | 333247 | |
| | —InBid——Session—— Substitute— | | | | | |
| Total Awarded: | 357478 | 357478 | | 175000 | 170054 | |
| haul MA to hot plant | 07500 | 07500 | 00783 | 87500 | | |
| haul AC to paver | 07500 | 07500 | 61996 | 87500 | | |
| AC truck haul site | 57005 | 57005 | 57005 | | | |
| AC truck haul road | 67 | 67 | 67 | | | |
| P3" A1-build ftg forms | 1545 | 1545 | 1545 | 2100 | | |
| P3" A2-form-pour ftg | 515 | 515 | 515 | 2100 | | |
| P3" A3-strip ftg forms | 258 | 258 | 258 | 2100 | | |
| P3" A4-pour floor slab | 1030 | 1030 | 1030 | 2100 | | |
| P3" A5-finish floor slab | 1030 | 1030 | 1030 | 2100 | | |
| PCC 2500 PSI | 47 | 47 | 37 | | | |
| PCC 3500 PSI | 0 | 0 | 0 | | | |
| MA Blend 1 | 00124 | 00124 | 45785 | | 80124 | |
| MA Coarse | 44513 | 44513 | 38154 | | 44513 | |
| MA Fines | 26708 | 26708 | 26708 | | 26708 | |
| MA Intermediate | 26708 | 26708 | 30524 | | 26708 | |
| Modify Query AutoAward Format Update Register Tools Print | | | | | | |
| >   Open form to enable awards with the <Enter> key | | | | | | |

FIG. 9 msE  cn1  EOS  PRODUCT EXAMPLE - STAYOUT                CHIEF . p0 . E95 . 30 . c3 01/09/96

|  |  | Quote |
|---|---|---|
| Company: | ZSUB1 | Training Data: Subcontractor 1  <Tab> |
| Quote Reference: | HAUL | 01/11/1996  18:35 |
| Phone: | 111-2222 | |
| Contact: | Fred | |
| Fax: | 222-3333 | |
| Licensed: | N | Price:  375000.00 |
| Insured: | N | Conditions:  0.00 |
| Bonded: | Y | Bond:  3750.00 |
| Ignore Quote: | N | |
| DBE Use: | | Total:  370750.00 |

Apply Bond @ : 10.000 per 1000

DBE Certs:

|   | Code | | | | Description | Forecast-Qty | UM | Spl | Unit | Total |
|---|------|---|---|---|-------------|--------------|----|----|------|-------|
| A | D-000004 | 2 | 2 |   | haul MA to hot plant | 25000.00 | TN | Y | 7.000 | 175000.00 |
| A | D-000004 | 2 | 4 |   | haul AC to paver | 25000.00 | TN | Y | 4.000 | 100000.00 |
| A | D-000004 | 2 | 4 | 3 1 | AC truck haul site | 15000.00 | TN | Y | 4.000 | 60000.00 |
| A | D-000004 | 2 | 4 | 3 2 | AC truck haul road | 10000.00 | TN | Y | 4.000 | 40000.00 |

Select Add Modify Delete Package Conditions Copy < > Print

> Select a Quote form for inspection, modification, or deletion

FIG. 10

```
ms-cn1-EXAMPLE ESTIMATE                                              CHIEF-p0-E95.30-c3  01/09/96
━━━━━━━━━━━━━━━━━━━━ LABOR RATES FOR TRAINING ━━━━━━━━━━━━━━━━━━━━━━━━━━━━━━━━━━━━ Labor Rate ━
LABOR ID: LL1              Description : UNSKILLED LABOR
                                      [ PgUp / PgDn  Scales >   Scale 1    Scale 2    Scale 3
                                                                10.000
B  a  s  e    W  a  g  e                         as $ or % of base   1.000
F  r  i  n  g  e  s
Travel  : 0.000 <   0.00 N      Oth-F1  : 0.000 <   0.00 N
Premum  : 0.000 <   0.00 N      Oth-F2  : 0.000 <   0.00 N
Holday  : 0.000 <   0.00 N      Subsnc  : 0.000 <   0.00 N
Savngs  : 0.000 <   0.00 N      Health  : 0.500 <   5.00 N
Penson  : 0.500 <   5.00 N      Apprnt  : 0.000 <   0.00 N
Vacatn  : 0.000 <   0.00 N
I  n  s  u  r  a  n  c  e                        as $ or % of base   2.000
BI&PD   : 0.000 <   0.00 N      Oth-I1  : 0.000 <   0.00 N
WkComp  : 2.000 <  20.00 N      Oth-I2  : 0.000 <   0.00 N
T  a  x  e  s    as $ or % of base [Base  +   Taxable (Y)]           2.000
FICA    : 1.000 <  10.00000      SUTA    : 0.500 <  5.000000
FUTA    : 0.500 <   5.000000     Oth-T1  : 0.000 <  0.000000
                                                                      5.000     20.000     25.000
                        Charge Rate per HR       Labor BURDEN        15.000     24.000     30.000
                                                    T O T A L        18.000
            Force Account Add-On : 3.000 > 20.00000
 Select │ Add   Modify  Delete  SetTax   Worksheet  <    Jump
> Select a resource rate for inspection, modification, deletion
```

FIG. 11

| ms-cn1–EXAMPLE ESTIMATE | | | | CHIEF-p0-E95.30-c3  01/09/96 |
|---|---|---|---|---|
| | | | | Cover Sheet |

Job Code        : EOS01                    Bid Date : 07/02/95        Bid Time : 11:am Job Name        : EXAMPLE ESTIMATE
Job Type        : HIGHWAY Job Location    : 2020 STATE ROAD
Job City        : PHOENIX
County          : YOURS
State           : AZ                       Country : UNITED STATES OF AMERICA Bid Location    : ENGINEER'S OFFICE
Opening Type    : OPEN                     Estimator : CHIEF
Proposal Type   : PRIME Plan Holders    : 5                        Contract Duration : 100     Time Measure : CAL-DAY Owner           : ZOWNR                    Training Data : Ow          Owners Estimate : 1000000.00
Architect       : ZARCH                    Training Data : Ar          Liq. Damages    : 1000.00
Engineer        : ZENGR                    Training Data : En DBE Certification
                                           Authority        : ZOWNR
                                           Training Data: Owner ┌─── Forecast Job Schedule ───┐                                        ┌──── Participation Goals ────┐
Start     Finish      Days                                              DBE    MBE    WBE   OBE1   OBE2
Date      Date        Duration
07/02/95  10/10/95    100                                               5.00   0.00   0.00  0.00   0.00

| Modify | Print | Jump |

> Modify this data

GRAPHICAL COMPUTER SYSTEM AND METHOD FOR FINANCIAL ESTIMATING AND PROJECT MANAGEMENT

TECHNICAL FIELD

The invention relates to computer methods and systems for price estimating, and also to methods and systems for financial management of projects.

DESCRIPTION OF THE BACKGROUND ART

The compiling of estimates, bids and proposals for financial projects is a complex process involving many steps. It is important, however, to the financial success of many companies that this process be carried out in a very accurate and organized manner. As with other systems involving a great deal of accounting data, the availability of computers and software for performing accounting tasks has allowed increased productivity and the ability to handle more complex tasks.

Specialized computer programs have been available for price and cost estimating, including prior programs of the assignee of the present invention. These programs have used text-based forms and spreadsheets in a program of the type commonly seen running under the DOS operating system. With the introduction of the Microsoft Windows operating system for desktop computers and servers, later versions of the program have incorporated pull-down menus and the mouse option for commands. The later versions of the program, however, have continued to utilize text-based forms and spreadsheets, as these are useful in handling many financial details of the bidding process.

The use of a sophisticated financial program to manage a complex bidding process requires training of the users to a somewhat greater degree than with common desktop applications. Now that the program has achieved a high degree of functionality, it is desired to make the program easier-to-use, thereby reducing training requirements, improving efficiency in bid and proposal preparation, and expanding the number of installations of the program in industry.

SUMMARY OF THE INVENTION

The invention provides a data map for navigating through the financial estimating process.

The data map is available with two optional, graphical modes of operation. In one graphical mode of operation, the user directs the computer to display a map in the form of a segmented pyramid. The segments of the pyramid provide active areas or buttons, which when selected with an input device, display an appropriate form with the text or financial details for that segment of the financial estimate. Using a pyramid paradigm, a reference is provided for relating direct costs, indirect costs and profits, in a structured fashion analogous to financial models familiar to users from the financial management literature.

The data map of the present invention is a "data structure navigation device" that makes the use of the traditional, and still available, pull-down menus largely unnecessary. Each segment or button in the data map provides direct access to the named data forms. In addition, routine reports can be ordered by activating one of a group of report buttons.

In a further aspect of the invention, the data map screen display also displays totals and percentages for major parts of financial estimates, including totals for direct costs, indirect costs and profits.

In an alternative graphical mode of operation, a series of objects in the form of process blocks are connected in a flow chart having a path that is displayed on the screen of the computer monitor. The path proceeds from left to right through a plurality of screen displays. The process blocks each have their own title bar and sequence number to assist the user in following a predetermined sequence in preparing a financial estimate.

The user can activate either of these data maps by selecting an appropriate button provided in a button bar incorporating specialized application icons. And, the program provides the ability to bypass the data maps, for users who have become accustomed to previous versions of the program.

The invention provides a computer program stored in a storage medium and including a first portion of program code for displaying detailed screen displays for preparing at least a portion of a financial estimate for a bid, estimate, proposal or project. The stored program further comprises a second portion of program code stored in the storage medium for displaying a data map in one or more screen displays, the data map having a plurality of segments which form major parts of a financial estimate. The segments of the data map graphically illustrate on the screen of the computer the elements of a process for preparing the financial estimate. The computer program further includes a third portion of program code responsive to a user selection of one segment of the data map to cause execution of said first portion of program code to display a selected detailed screen display.

The computer program may also further include a fourth portion of program code for displaying totals on the screen corresponding to the major parts of the cost estimate. When the details of the detailed screen displays are changed, the totals can be recalculated either automatically, or upon user command, as is now typical with spreadsheets.

The preferred form of data maps of the present invention is one face of a pyramid, and in one alternative can also take the form of flow charts. Various data maps can be used according to whether the project is for the private sector or is subject to the Federal Acquisition Regulations.

The invention further provides a button bar having a button responsive to one or more user inputs to select and display a selected data map.

Other objects and advantages of the invention, besides those discussed above, will be apparent to those of ordinary skill in the art from the description of the preferred embodiment which follows. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF DESCRIPTION OF THE DRAWINGS

FIGS. 5–11 are a series of detailed screen displays in the estimating module of FIGS. 2 and 3;

DETAILED DESCRIPTION OF THE PREFERRED EMBODIMENTS

Figure 1:
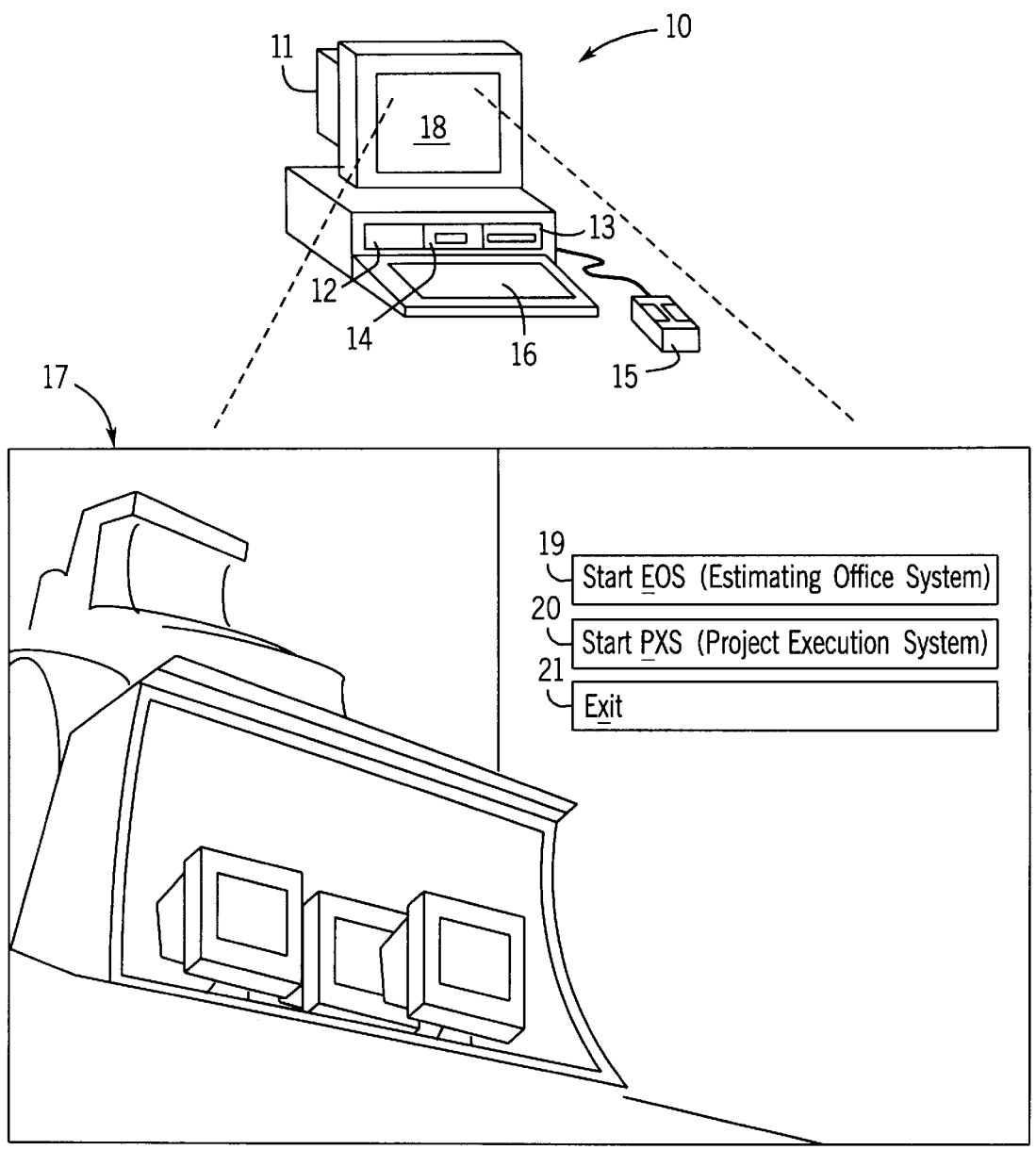
FIG. 1 illustrates a desktop computer with a start-up screen display illustrating the start-up operation of a computer system utilizing the present invention.

The method and system of the present invention are embodied in portions of a computer program code 1, 2 (FIG. 1A) which can be installed on conventional and commercially available desktop computers or network server computers 10 (FIG. 1). Typical computer hardware for utilizing the invention, as seen in FIG. 1, includes an IBM-compatible Pentium 100 Mhz computer 10, including 32 Mb of RAM (not shown), an SVGA-compatible color monitor 11, a 650 Mb or greater capacity hard disk drive 12, a 3.5-inch floppy disk drive 13, a 4× CD-ROM 14, a Microsoft or Microsoft-compatible mouse 15, a suitable keyboard 16, and suitable graphics and network interface cards (not shown).

Figure 1A:
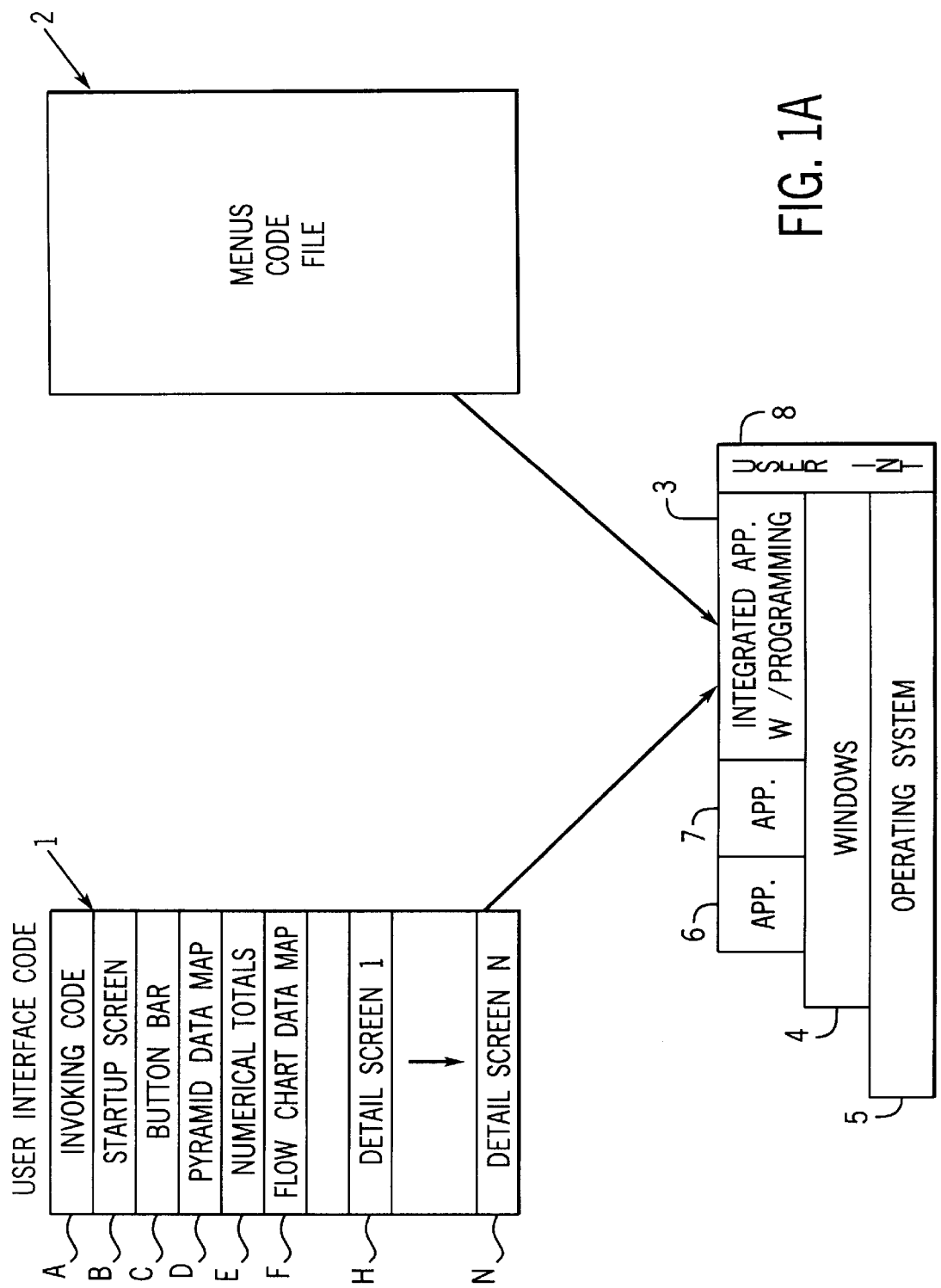
FIG. 1A is block diagram of the computer program code of the present invention.

The computer programs represented in FIG. 1A are loaded into hard disk drive 12, including a Windows operating system, such as Windows 3.11 or Windows 95 for an individual desktop computer in which the operating system is also installed on hard disk drive 12. In a network configuration, the program would be further divided into a server portion running under a Novell 3.12 operating system or a Windows NT 3.5.1 or 4.0 operating system, and workstation computers running operating systems such as Windows 3.11, Windows 95 or Windows NT 3.5.1 or 4.0. The workstation computers may be desktop or laptop computers, or a terminal with access to the server may be used. An advantage of the networked system is that all of the workstation computers may access a common set of data stored on the server. These systems are just examples and the invention may be carried out with other hardware and operating systems as well.

This computer program has been distributed in prior versions under the trademark, Hard Dollar®, by the assignee of the present invention. Prior versions have been characterized by various screens for inputting textual and numeric data. Prior versions included pull-down menus, but otherwise did not incorporate a graphical user interface.

Referring to FIG. 1A, the computer program of the present invention is contained in two files 1, 2 which are executed by an integrated application program 3 which includes spread-sheet, word processing, communications, database and programming capability. Such a program 3 and development tool is available from ANGOSS, Toronto, Ontario, Canada. The files 12 and program 3 run along with other application programs 6, 7 in a Windows operating environment as specified above, shown in FIG. 1A with the Windows shell 4 running with a basic operating system 5. As is known in the art, elements 4 and 5 may be merged as in the case of Windows 95.

The first file 1 is program code written in pseudo-code using FOR, WHILE, CASE and IF THEN ELSE constructs. This file 1 controls display of screens in the user interface 8 as illustrated in more detail in FIGS. 1–34. The second file 2 is also written in such code, but this file controls display of Windows command menus.

The screens are displayed and menu commands are executed in response to various user inputs through the mouse 15 and keyboard 16 (FIG. 1). These input devices 15, 16 are mentioned by way of example, and it is contemplated that other input devices could be used to generate user inputs to be described herein.

There are different portions of code A–N within each file 1, 2, for producing the various displays seen in FIGS. 1–34. There may be as many as four hundred portions A–N in the file 1, and the jump from execution of the program 3 first invokes portion A of the program file 1, which then calls for execution of other portions B–N. For purposes of the present explanation, it will be assumed that there is a portion for each major part of the display, but it should be understood that the portions B–N of the program file 1 may invoke other portions A–N of the program file 1, as well as the Windows shell 4 and operating system 5 to cause display of the screen displays to be described herein.

Referring to FIG. 1, when the Hard Dollar® application program is started by double clicking on an icon, for example, and the start-up screen 17 seen in FIG. 1 is displayed on the screen 18 of a SVGA-compatible monitor 11. There is a portion of code B in program file 1 which is executed to cause display of start-up screen 17.

There are three active areas or buttons 19, 20, 21 on the screen 18 with legends for "Start EOS," "Start PXS" and "Exit" for returning to the desktop display for the operating system. "EOS" is the acronym for the Estimating Office System™ (EOS™), which is the estimating module of the Hard Dollar™ program. "PXS" is the acronym for the Project Execution System™ (PXS™), which is the project management module of the Hard Dollar™ program.

Figure 2:
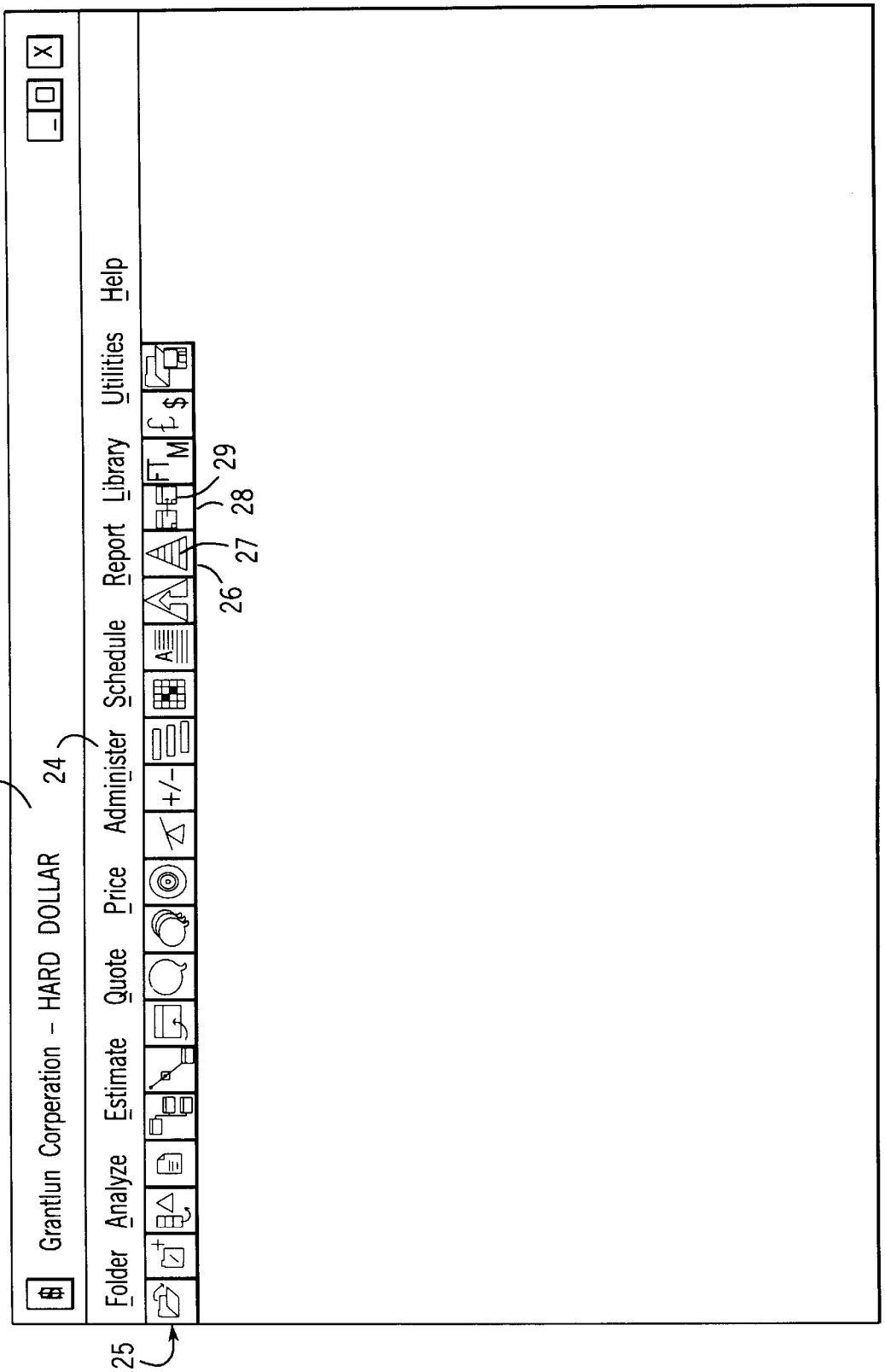
FIG. 2 is a first screen display for an estimating module, which can be selected through the screen display of FIG. 1.

By double clicking on the "Start EOS" button 19, or by positioning the cursor over it, selecting it, and operating an execute key command, a screen display 22 is visible on the monitor 16 as seen in FIG. 2. The EOS™ start-up screen 22 has a title bar 23, a command menu bar 24 and a command button bar 25, of a type generally available in the Windows operating system. The command button bar 25, however, is a customized or optional feature, and in this instance, contains customized buttons, including a button image 26 with a pyramid icon 27 and a button image 28 with a flow chart icon 29. This customized button bar is displayed in response to execution of program code C in program file 1.

Figure 3:
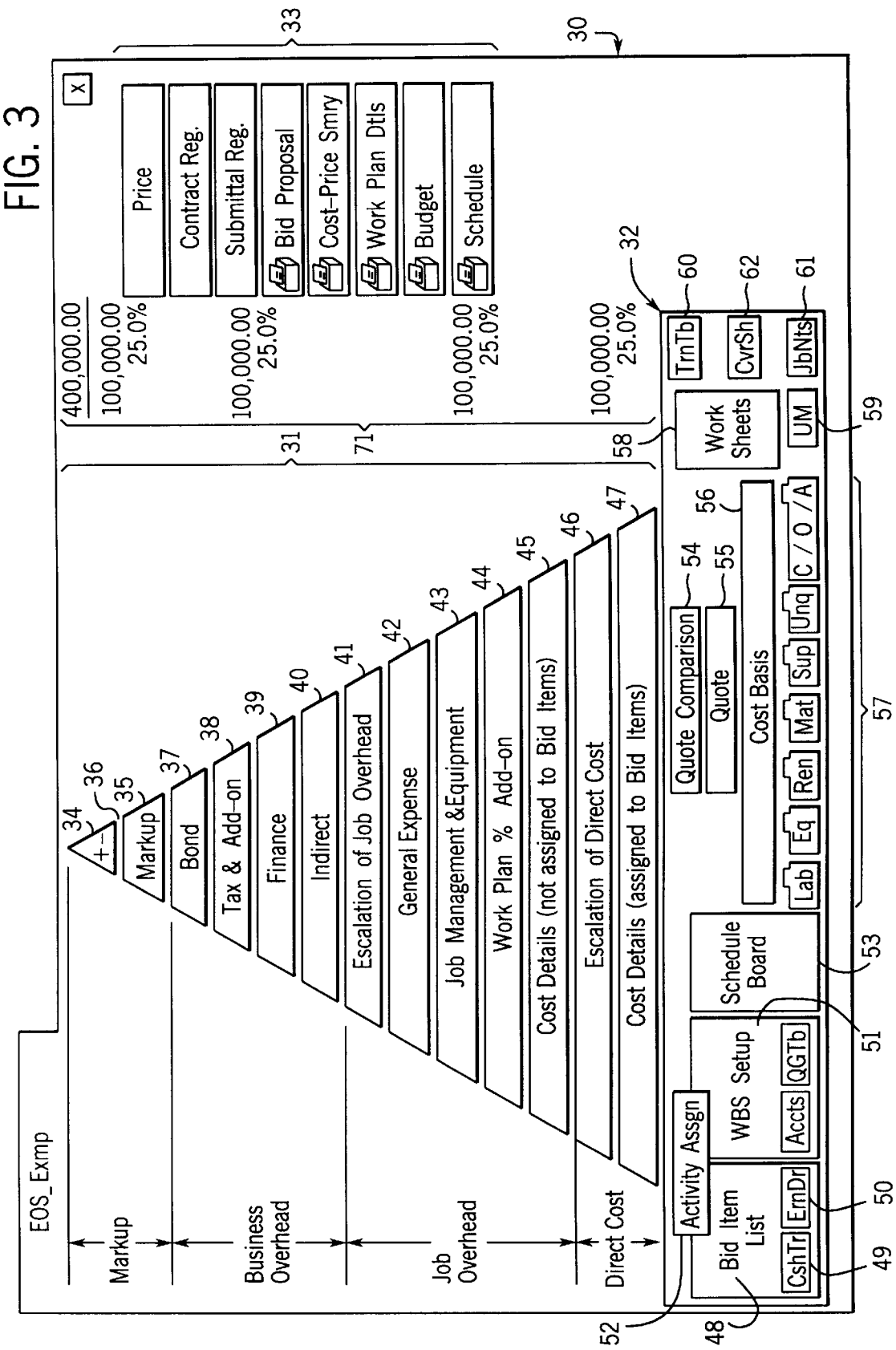
FIG. 3 is a pyramid navigation screen display for assisting the input of data in preparing a bid for non-federal government projects, this screen being selected through one of the command buttons seen in the screen display of FIG. 2.

FIG. 3 shows a "pyramid" navigational graphic screen display 30 for bids, proposals and projects for the private sector or state or local governments, but not for the federal government. The pyramid portion 31 (actually one side of a 3-dimensional pyramid) comprises transversely extending segments 34, 35, et seq., with legends. The segments are separated vertically by spaces 36. Each segment 34, 35, et seq., comprises an active area or button, which when executed will bring up further screen displays for preparing elements of a final bid or proposal price. The segments 34, 35, et seq., are organized by functional categories related to bid preparation and cost estimating. This pyramid 31 is displayed in response to execution of program code D in program file 1.

Below the pyramid is a rectangular box or base 32, containing rectangular active areas 48, 49 et seq. These also can be selected and executed to bring up further screen displays. These categories are arranged by type of data structure. The data structures hold the data for developing the results for the functional categories in the pyramid 31. This base 32 is displayed in response to execution of program code D in program file 1.

Along the right side of the screen display 30 are a number of output buttons 33 for frequently requested reports on proposals, cost and pricing summaries, work plan details, budgets and schedules. There are also buttons 33 in this group for displaying summaries of pricing data, a contract register and a submittal register. The buttons 33 are displayed in response to execution of program code D in program file 1.

Between the pyramid 31 and the report buttons 33 is a "totals and percentages" display 71. This display 71 is displayed and totals and percentages are updated by executing a code portion E (FIG. 1A) in program file 1.

The individual categories with active areas in the pyramid and base structure in FIG. 3 are defined as follows. Starting at the top of the pyramid 31, a bid price for a job or for its items is comprised of four major parts: 1) Markup, 2) Business Overhead (Burden), 3) Job Overhead Cost and 4) Direct Cost. The value of the parts is established using various forms which are called up when one of the segments is selected for execution.

Markup establishes the return of profit and operating cost contribution that is acceptable to the proposer. It is established on a markup form and can be adjusted at the last minute using the cut/add (+/−) form. These forms are accessed through the markup segment 35 and the cut/add segment (+/−) 34 above the markup segment 35 on the pyramid 31.

Below the Markup Group is the Business Overhead Group, also known as "burden," which defines the total of those costs that are driven by the company's overall business activities. Within this group is the Bond segment 37 which defines the cost of purchasing performance and payment bond that will be required based on the job's total price. Bond expense is calculated using a target bid price and a bond rate set up in a bond rate table. Next, the Tax & Add-On segment 38 defines the cost of those miscellaneous taxes and fees that are driven by some portion of a job's total price, e.g. privilege taxes, sales taxes, parent corporation assessments for business services, etc. This is followed by the Finance segment 39 which defines the cost of money needed to build a job as planned, scheduled and priced. Finally, in this group, is the Indirect Cost segment 40 which defines the cost of those miscellaneous fees and assessments that are driven by cost category totals, e.g. business association membership dues, parent corporation assessments for business services, etc. This is also sometimes referred to as general and administrative (G&A) expense.

The next group is the Job Overhead group of segments 41–45, which includes the total of those costs attributable to the job as a whole, not any one construction activity or bid item. This group includes an "Escalation of Job Overhead" segment 41 which defines the cost of changes that accrue, such as overtime, inflation, wage and price hikes, etc. Through this segment, access is provided to a form on a detailed screen display as seen in FIG. 5. Code Portions H to N are executed in program file 1 to display this detailed screen and the other detailed screens to be described herein.

Following segment 41, the General Expense segment 42 can be activated to bring up a worksheet or form to summarize the cost of anything else needed to conduct a job; e.g. yards, vans, security, etc. The Job Management and Equipment segment 43 covers the cost of those labor and equipment resources that are needed to conduct a job. Through this segment, access is provided to a form on a detailed screen display as seen in FIG. 6. The Work Plan % Add-on segment 44 covers those job-wide costs that are driven by a cost category total, e.g. an allowance for the purchase of small tools based on a percentage of total labor cost (as labor cost is added, the allowance grows). The Cost Details segment 45 includes the cost of those resources employed, installed, consumed or expended to perform a construction activity that are not assigned to bid items.

Job overhead costs are established in forms such as the general expense form, job management & equipment form, work plan % add-on form, or in activity forms. They are automatically reported by cost category to the escalation form seen in FIG. 7. Other forms with names corresponding to the pyramid segment are called up and displayed when the appropriate segment is selected and executed.

The bottom portion of the pyramid contains the Direct Cost group of segments 46, 47. The total of those costs relates to a specific construction activity. There is an "Escalation of Direct Cost" segment 46 which defines the cost of changes that accrue over time, e.g. inflation, wage and price hikes, etc. The Escalation of Direct Costs and the Escalation of Overhead costs are summarized in a form seen in a detailed screen display as illustrated in FIG. 7. The basic Cost Details segment 47 summarizes and collects the costs of those resources employed, installed, consumed or expended to perform a construction activity which is assigned to bid items (compared with cost details in job overhead which are not assigned to bid items).

The foundation or base structure 32 illustrated and displayed below the pyramid 31 in FIG. 3 contains active areas or folders for the following data structures or collections of data. The Bid Item List folder 48 contains a list of those things that are measured and paid for as compensation for building the job. The Cash Terms (CshTr) folder 49 holds a list of the cost, payment terms, and collection terms for the money used in the project. The area 50 labeled "ErnDr" is activated to bring up a list of those activities that drive each bid item's earnings. The area 51 labeled "WBS" Setup refers to a Work Breakdown Structure (WBS) which is an outline and definition of "activities" necessary to form the job. Activities can be arranged in a hierarchy with as many as five levels. The area 52 labeled "Activity Assignments" contains a list of those activities that contribute to each bid item's price structure. The area 53 labeled "Schedule Board" is linked to a form containing a schedule of the order and timing of each activity. The "Quote Comparison" area 54 is linked to a table illustrated in FIG. 8 for comparing quotes for performing work or providing resources. The "Quotes" folder 55 contains a table of the prices quoted by others for performing work or providing resources required to build a job as illustrated in FIG. 9. The "Cost Basis" folder 56 includes a cost basis table of calculation rules for evaluating a job's price structure. Resource rate folders 57 are provided for holding the charge rates for the employment of individual resources on any activity. These resource rates include tables with rates for labor (FIG. 10), equipment, rentals, material, supply, unique rates and crew rates. The "Work Sheets" folder 58 contains the custom worksheets with data effecting the job's price structure or data foundation. A UM (unit of measure) folder 59 contains English-to-metric unit of measure conversion factors.

The transfer table (labeled "TrnTb") 60 contains a list of quantity or production data copied from a worksheet or imported from another system. General data includes a job notes (JbNts) area 61 with general comments about the job that effect its cost and price. The cover sheet (CvrSh) folder 62 contains a profile of the job and its DBE (Disadvantaged Business Entity) goals, as illustrated in FIG. 11.

After item prices have been established for each item in a bid or proposal, the proposal may be published by printing it, creating an output file or exporting it to another program such as a spreadsheet program for further analysis.

Figure 4:
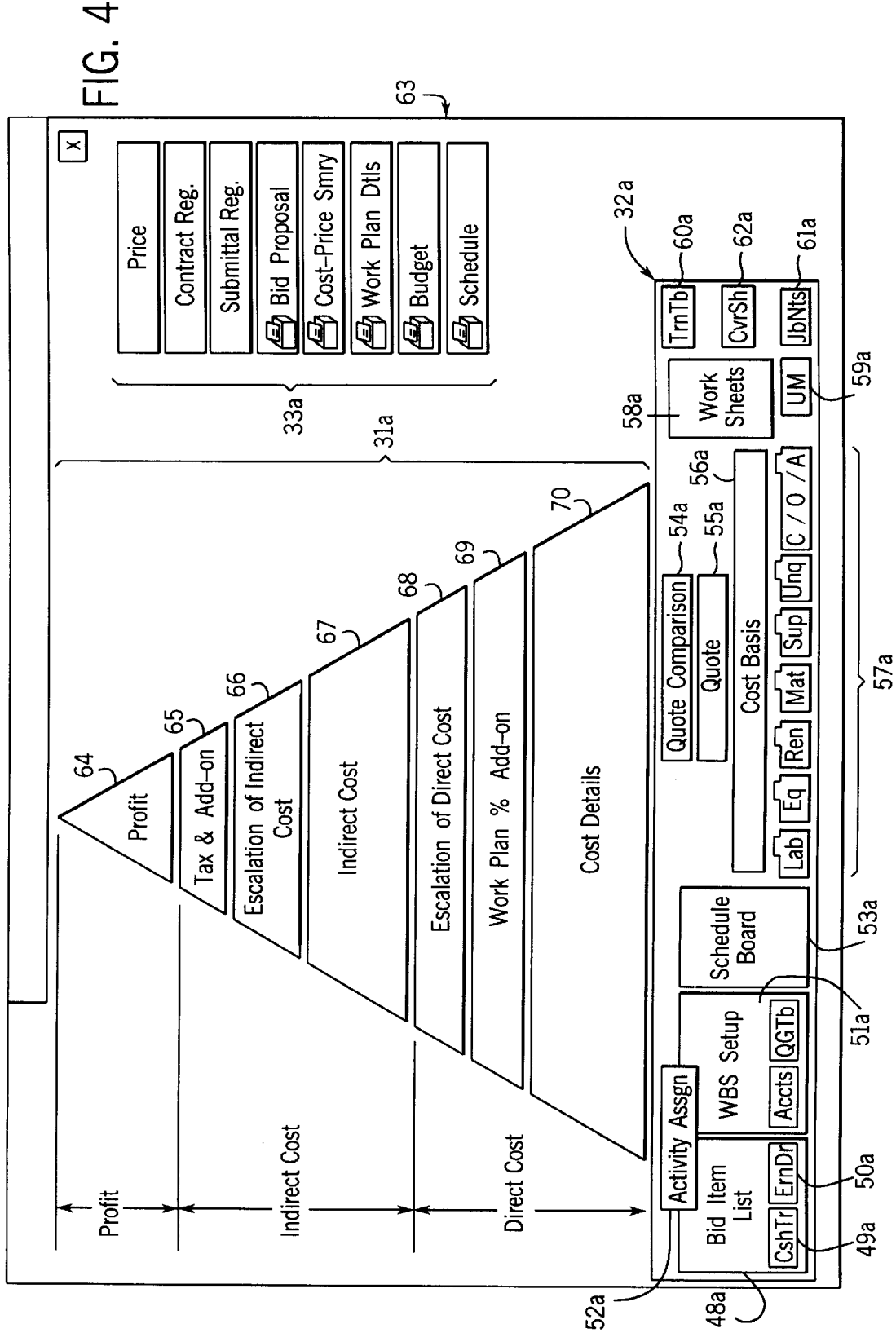
FIG. 4 is a pyramid navigation screen display for assisting the input of data in preparing a bid or proposal under the Federal Acquisition Regulations, this screen being selected through one of the command buttons seen in the screen display of FIG. 2.

Referring to FIG. 4, another pyramid navigational structure is provided on a screen display 63 for jobs to be estimated under the Federal Acquisition Regulations (FAR). This option is selected when a job folder is set up to hold the proposal as an initial step in preparing a bid or proposal. When the FAR option is selected, a different pyramid appears as the pyramid navigation screen and different forms will appear in response to activating segments of the pyramid navigation screen display 31a.

In the FAR pyramid display 31a, the markup segment is changed to the "profit" segment 64, and there is no cut/add segment. The term "burden" is not used to summarize general business expenses. Instead, such expense is divided into three segments: a Tax & Add-on segment 65, an Escalation of Indirect Cost segment 66 and an Indirect Cost segment 67. Thus, in this bid process many items of indirect general business expense are lumped together in comparison with the first pyramid navigation display discussed above.

The Direct Cost group of segments includes the Escalation of Direct Cost segment 68, the Work Plan % Add-on segment 69 and a Cost Details segment 70. The Work Plan % Add-on segment 69 totals those job-wide costs that are driven by a cost category total, e.g. an allowance for the purchase of small tools based on a % of total labor cost (as labor cost is added, the allowance grows). The Cost Details segment 70 includes the direct costs of those resources employed, installed, consumed or expended to perform a construction activity this is assigned to contribute to a bid item's price structure. The term "job overhead" is not used in this display but is instead included in direct costs through the detailed forms.

In FIG. 4, the data foundation 32a contains the same data structures, as the bid estimating process related to FIG. 3, however these have been given an "a" suffix in FIG. 4. The output buttons 33a on the screen display in FIG. 4 are also the same as seen in FIG. 3, and these have been given an "a" suffix in FIG. 4.

Figure 12:
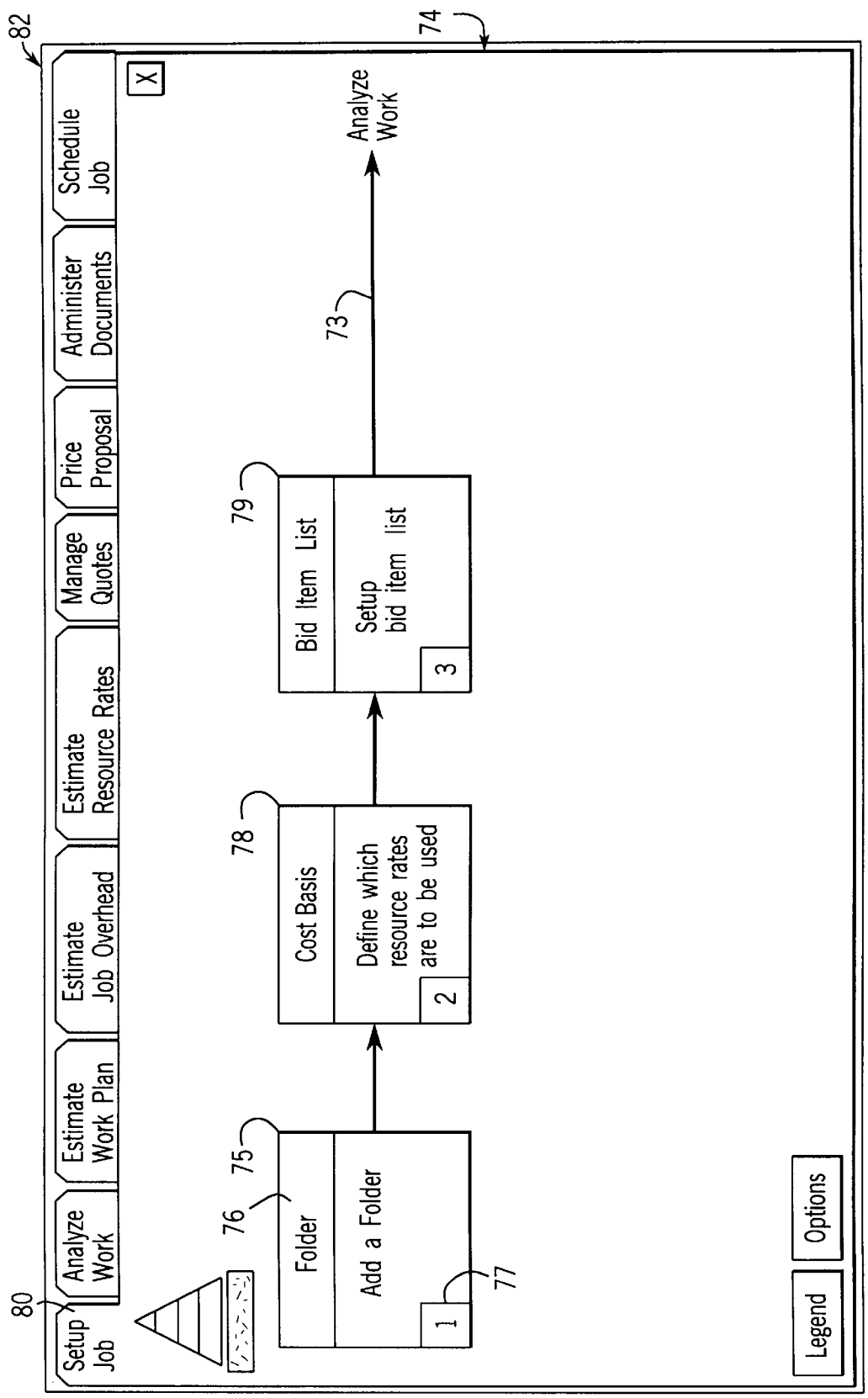
FIGS. 12–20 are a series of screen displays that form an alternative data map through a series of detailed screen displays for preparing a bid for non-federal government projects in the estimating module of FIG. 2.

Returning to FIG. 2, the user has the option of selecting another navigation aid from the command button bar 25. By selecting the flow chart button image 28, a code portion F in program file 1 (FIG. 1A) is executed to display screen display 74 as seen in FIG. 12 to begin a flow chart sequence along a path 73.

The flow chart that extends through FIGS. 12–20 is part of a multi-tab, multi-dialog panel structure 82 of a general type seen in Windows-based applications. It has, however, been customized for the present invention by selecting and arranging the categories for the tabs, defining the number of tabs and panels and most importantly, creating the flow chart displays. The first block 75 in the sequence is a folder block. It has a title bar 76 and sequence number 77. It is shown in white against a gray background to denote that it is active. When block 75 is selected and executed, a screen will come up for entering data to initiate a new job folder or open an existing job folder.

The screen display 74 is shown when the tab "SETUP JOB" 80 is selected. The second process block 78 in FIG. 12 is linked to the cost basis data structures similar to area 56, 56a in the pyramid navigation screen displays 31, 31a. The next process block 79 in FIG. 12 is linked to data structures similar to the bid item list 48, 48a in the pyramid navigation screen displays 31, 31a.

Figure 13:
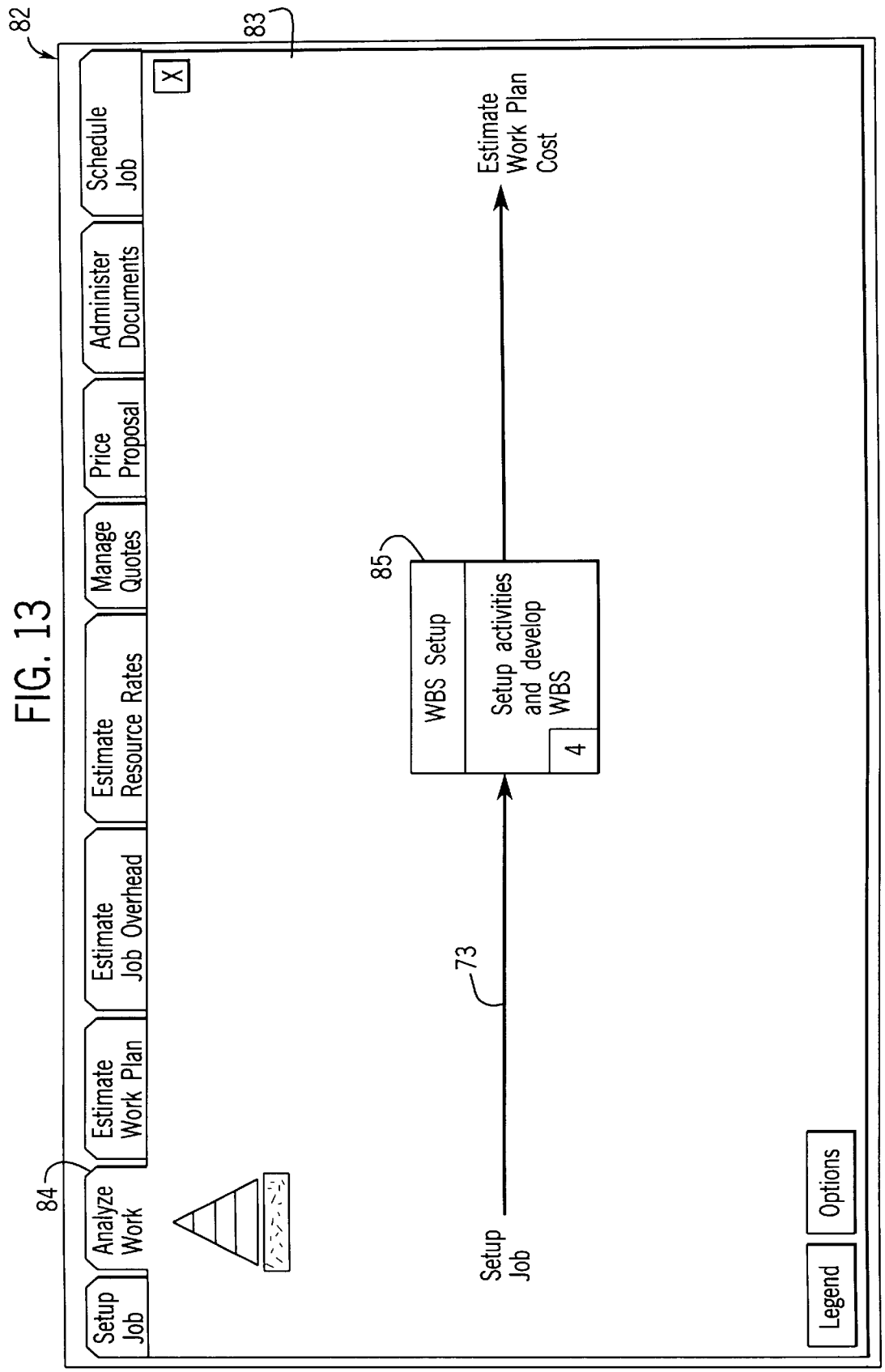

Referring next to FIG. 13, a second screen display 83 in the series of FIGS. 12–20 is activated by selecting the next tab 84 for "Analyze Work." The next process block 85 with a sequence number "4" is linked to data structures similar to the WBS Setup area 51, 51a in the pyramid navigation screen displays 30, 30a.

Figure 14:
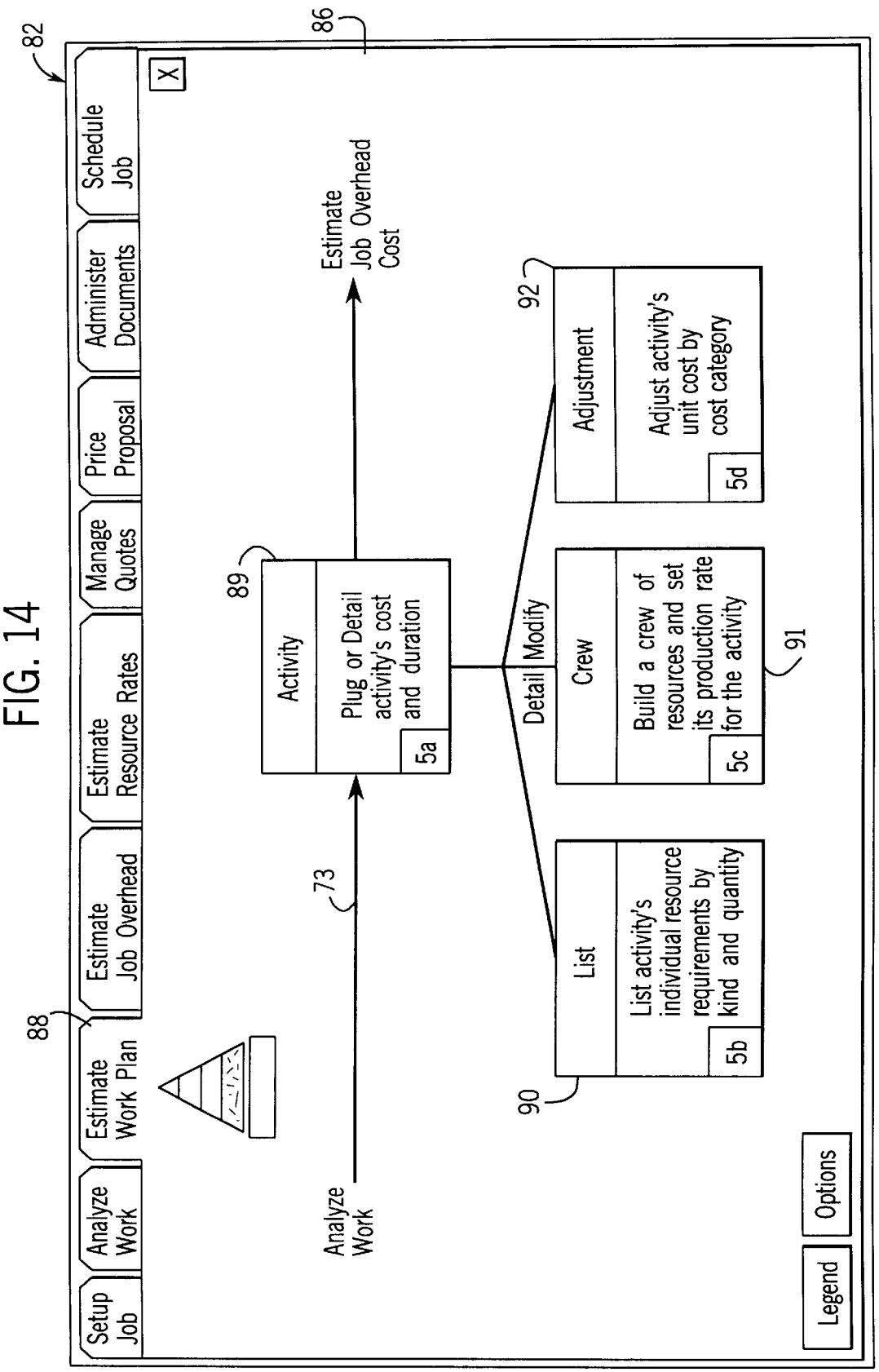

Referring next to FIG. 14, a third screen display 86 in the series of FIGS. 5–13 is activated by selecting the next tab 88 for "Estimate Work Plan." The next group of process blocks 89, 90, 91 and 92 are related through a sequence numbers "5a", "5b", "5c" and "5d". Process block 89 relates to establishing "activities" in the Work Breakdown Structure (WBS). Process blocks 90, 91 and 92 contains details as to resources, crew and adjustments by cost category.

Figure 15:
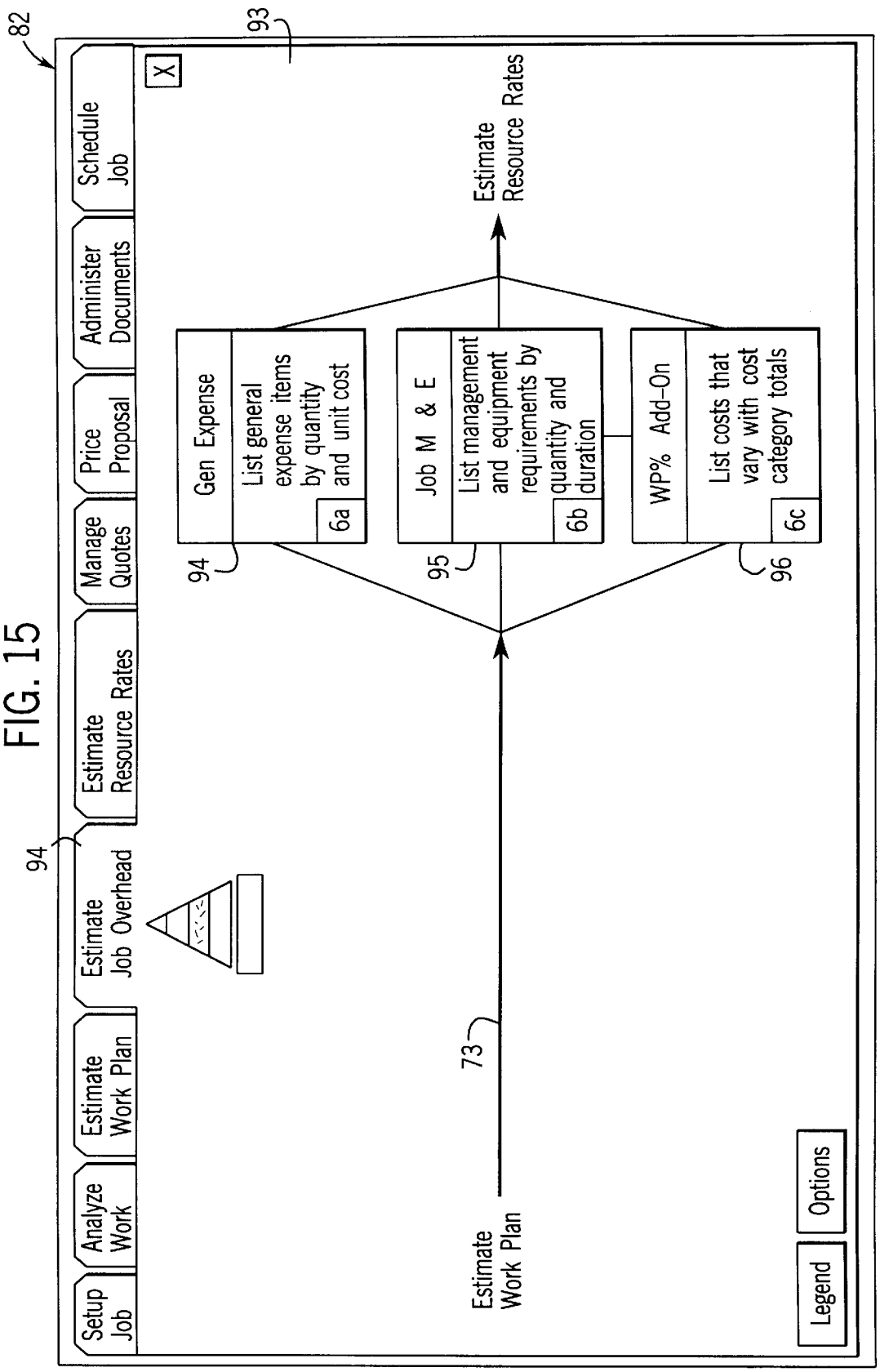

Referring next to FIG. 15, a fourth screen display 93 in the series of FIGS. 5–13 is activated by selecting the next tab 94 for "Estimate Job Overhead." Process blocks 94, 95 and 96 displayed on this screen correspond to segments 42–45 of the pyramid 31 in FIG. 3.

Figure 16:
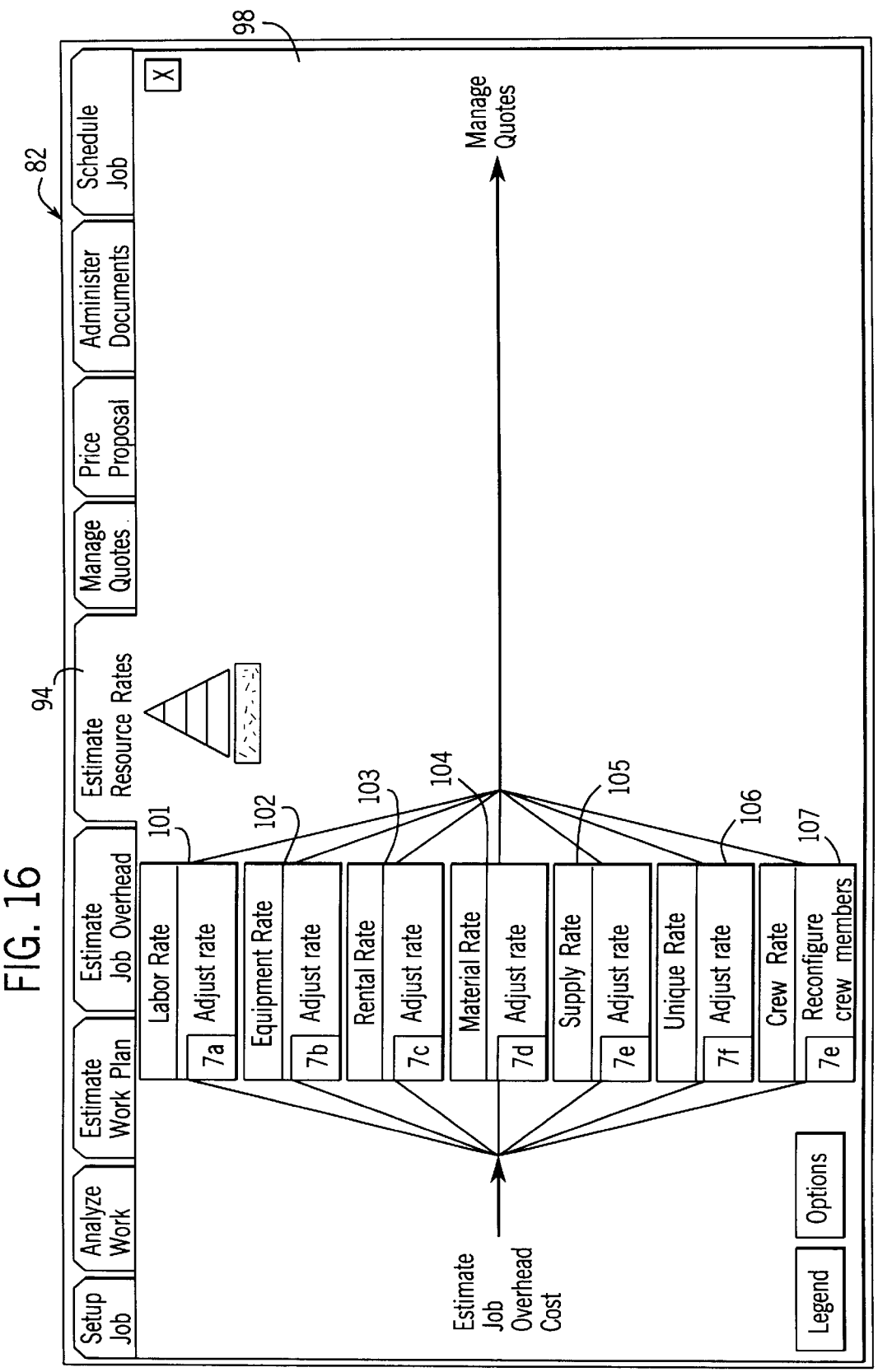

Referring next to FIG. 16, a fifth screen display 98 in the series of FIGS. 12–20 is activated by selecting the next tab 94 for "Estimate Resource Rates." Process blocks 101–107 allow access to worksheets or forms for resource rates for labor, equipment, rentals, material, supply, unique rates and crew rates also accessed through folders 57 in FIG. 3.

Figure 17:
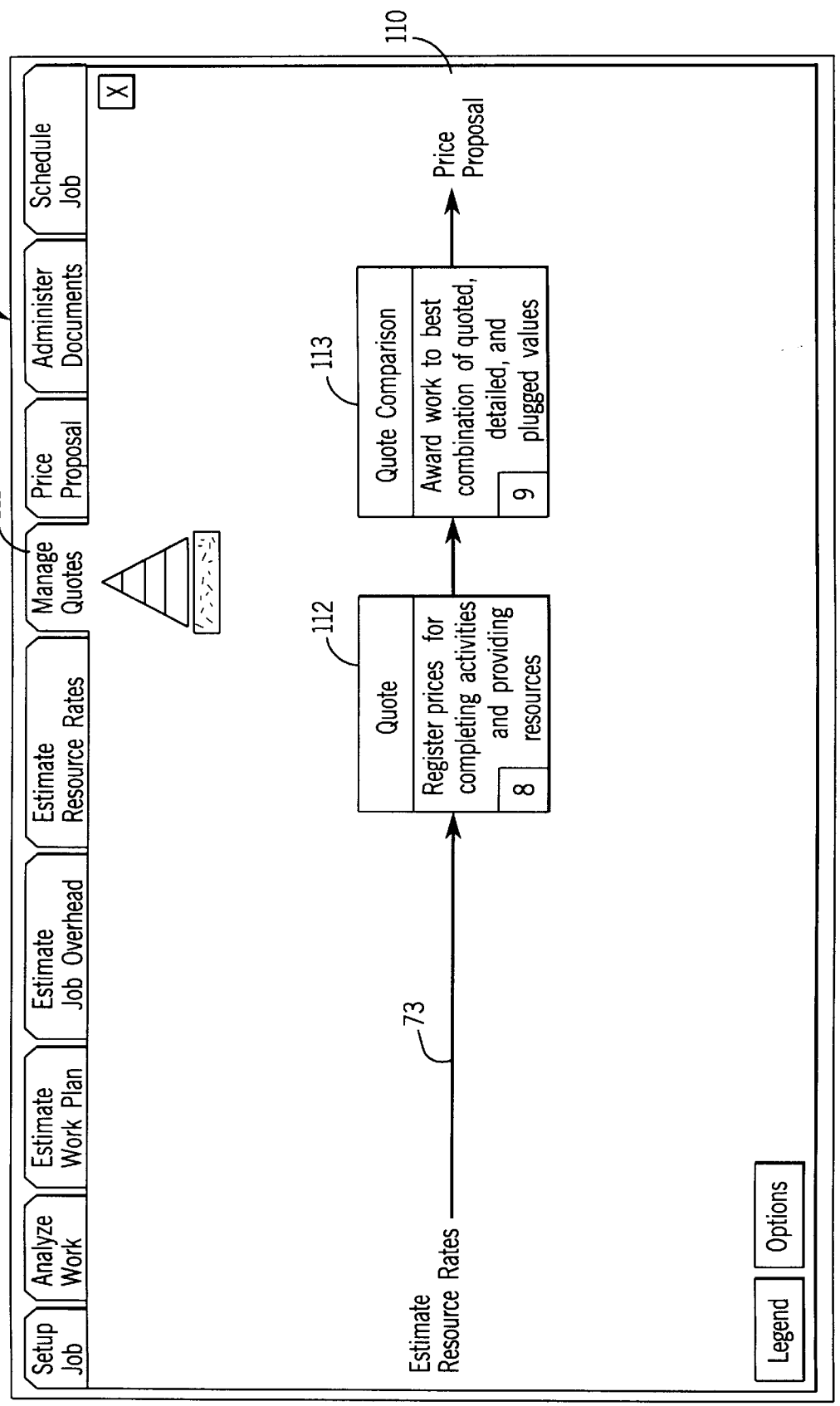

Referring next to FIG. 17, a sixth screen display 110 in the series of FIGS. 5–13 is activated by selecting the next tab 111 for "Manage Quotes." Process blocks 112, 113 with sequence numbers "8" and "9" correspond to the Quotes and Quote Comparison folders 54, 55 in FIG. 3.

Figure 18:
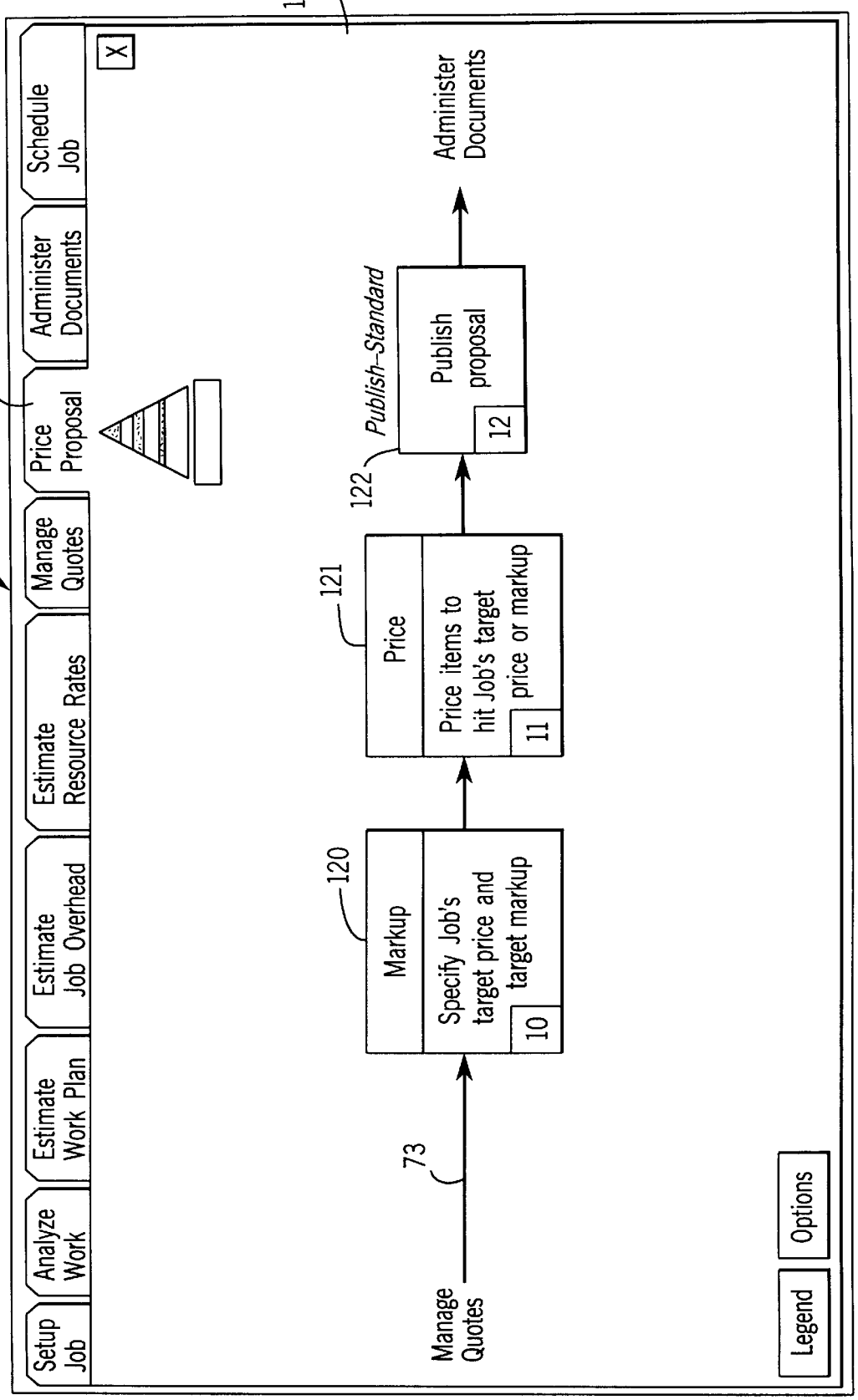

Referring next to FIG. 18, a seventh screen display 118 in the series of FIGS. 12–20 is activated by selecting the next tab 119 for "Price Proposal." This screen display contains process blocks for operating a key module of the computer program known as the price module. Process blocks 120 with sequence number "10" corresponds to the Markup module 35 in FIG. 3. The "Price" process block 121 with sequence number "11" links to a list of items for which final prices can be established. Process block 122 with sequence number "12" is an optional process block for publishing (through printing or output) a file with the final proposal.

Figure 19:
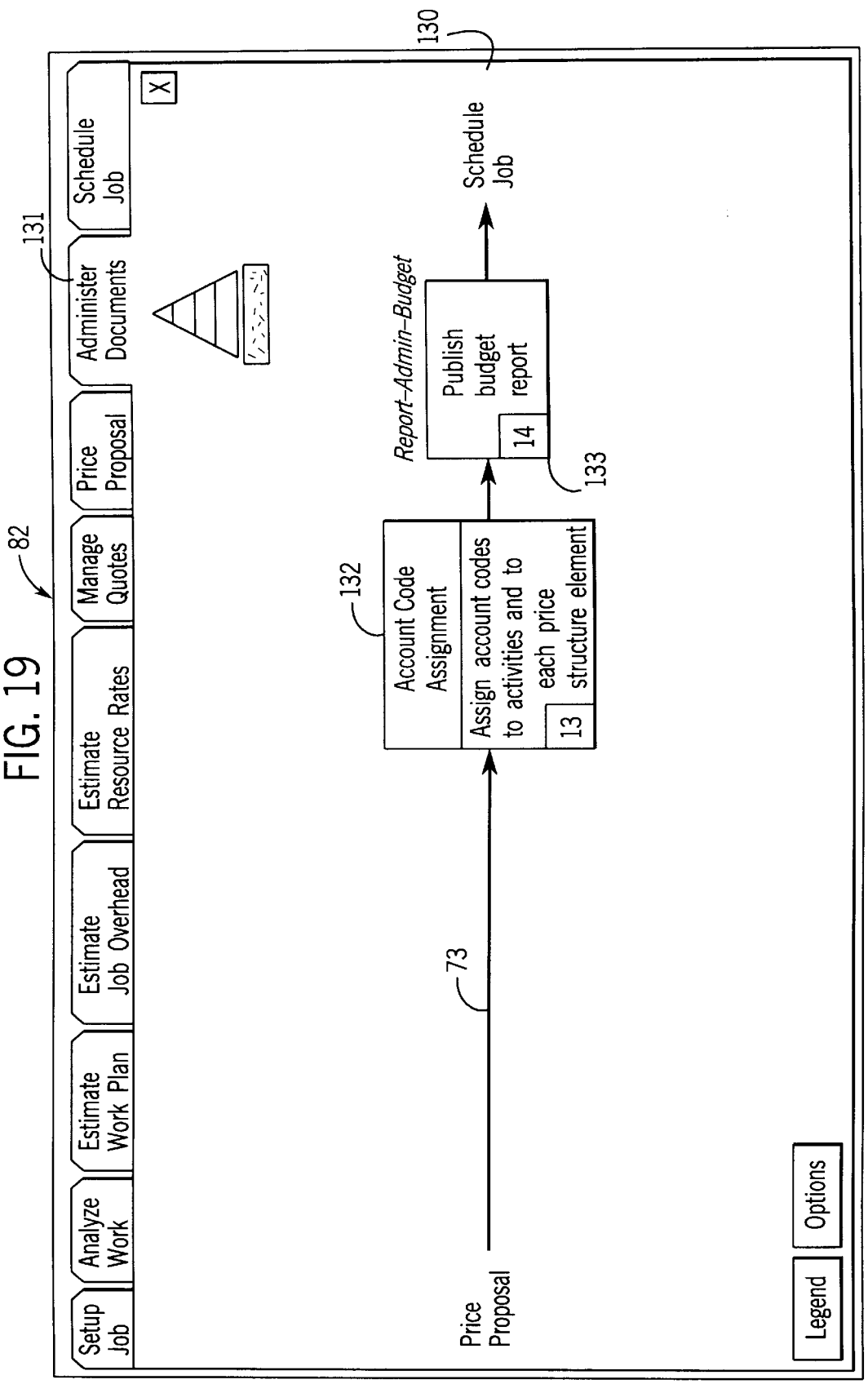

Referring next to FIG. 19, an eighth screen display 130 in the series of FIGS. 12–20 is activated by selecting the next tab 131 for "Administer Documents." Process block 132 with sequence number "13" corresponds to the assignment of account codes to activities area 52 in FIG. 3. Optional process block 133 with sequence number "14" allows publishing of a budget report which is similar to one of the output buttons 33 in FIG. 3.

Figure 20:
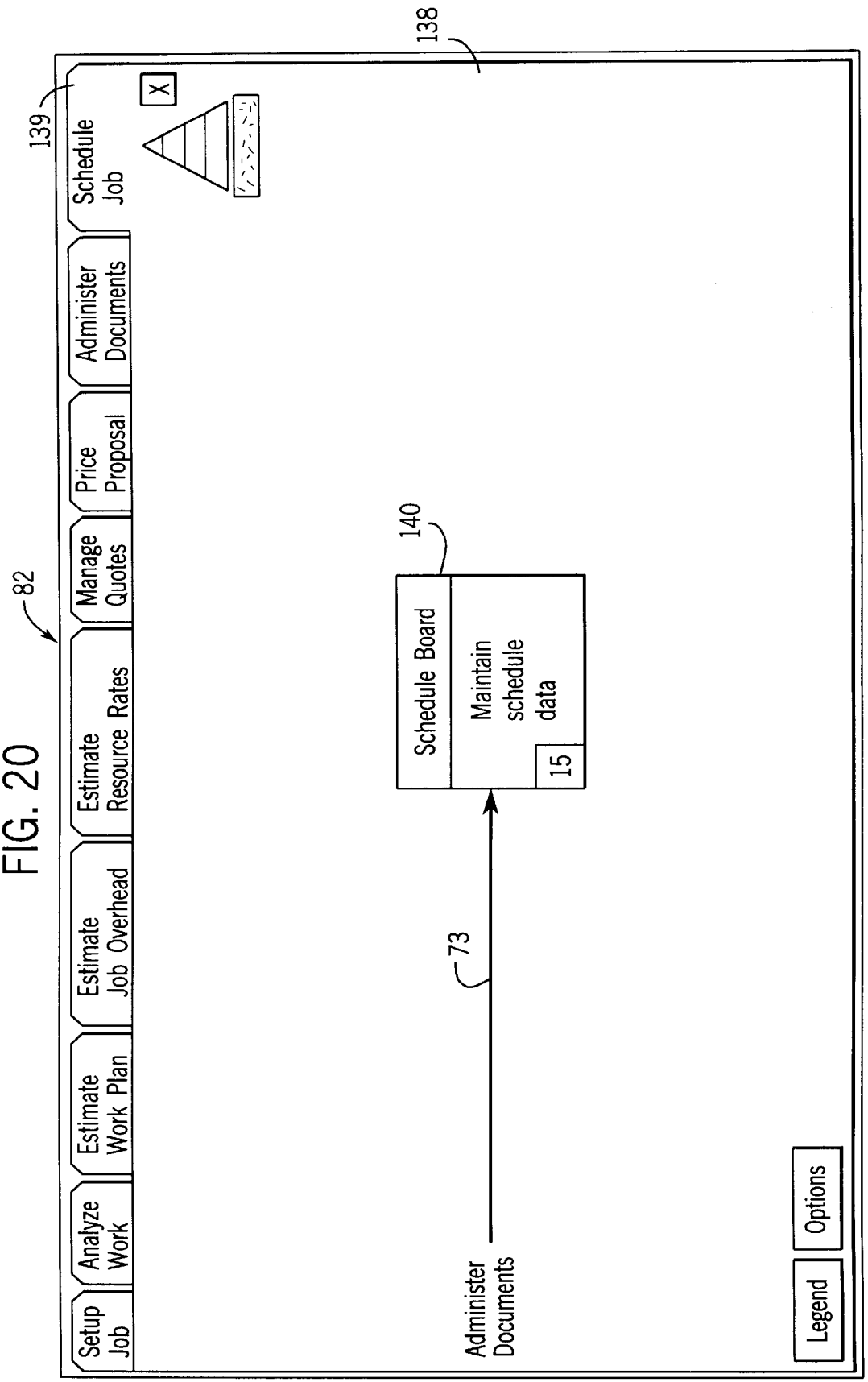

Finally, in FIG. 20, the last screen display 138 in the series of FIGS. 5–13 is activated by selecting the next tab 139 for "Schedule Job." This screen display 138 provides a process block 140 for calling up the form for schedule data, which completes the bid and proposal preparation process.

Figure 21:
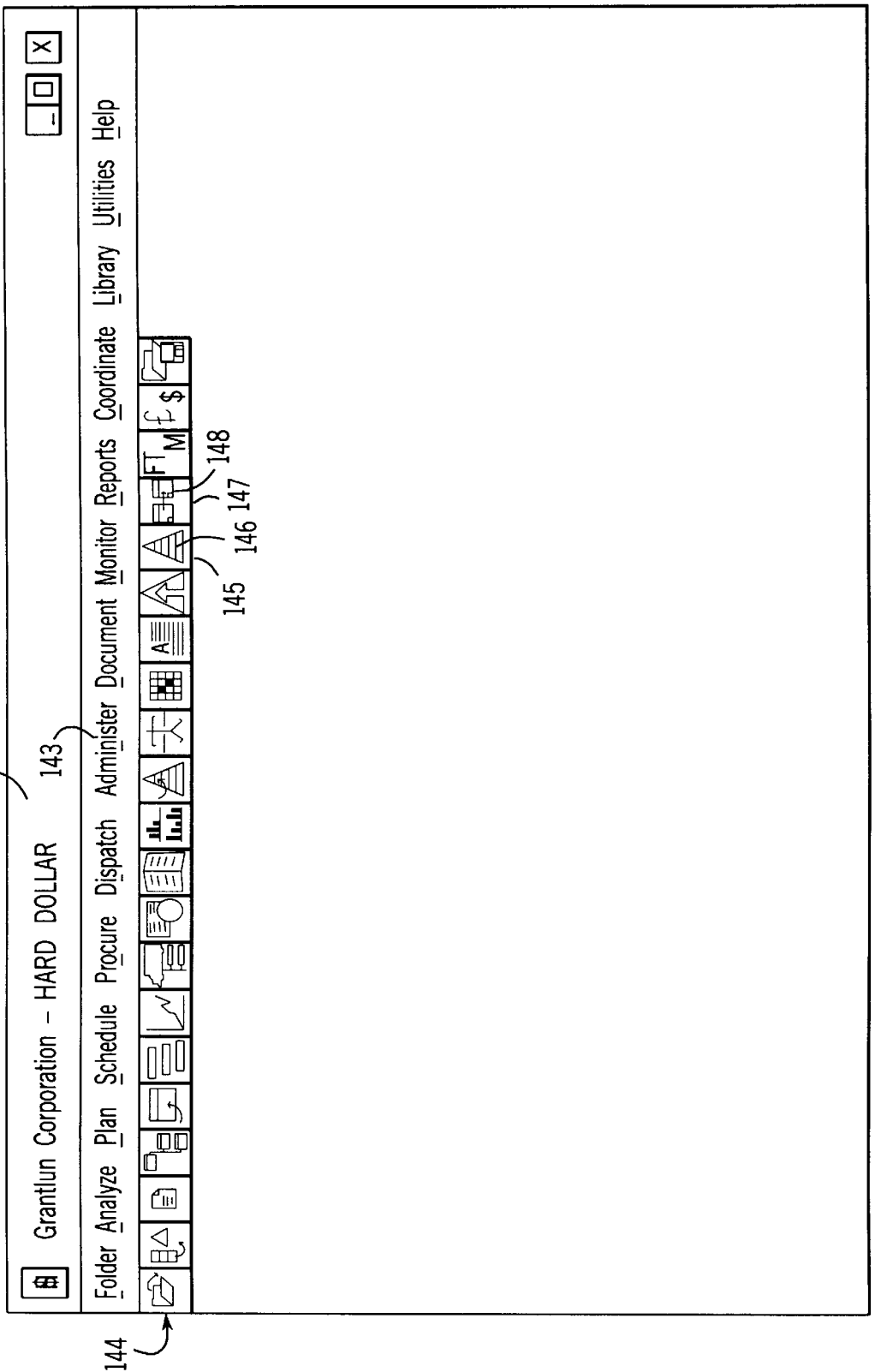
FIG. 21 is a first screen display for a project management module, which is a second one of the two modules of the present invention that can be selected through the screen display of FIG. 1.

Returning to FIG. 2, when the PXS™ button 20 is selected and executed, a screen display 141 is visible on the monitor 16 as seen in FIG. 21. The PXS™ start-up screen 141 has a title bar 142, a command menu bar 143 and a command button bar 144 similar to the EOS™ module. The command button bar 144, in this instance, also contains customized buttons, including a button image 145 with a pyramid icon 146 and a button image 147 with a flow chart icon 148.

Figure 22:
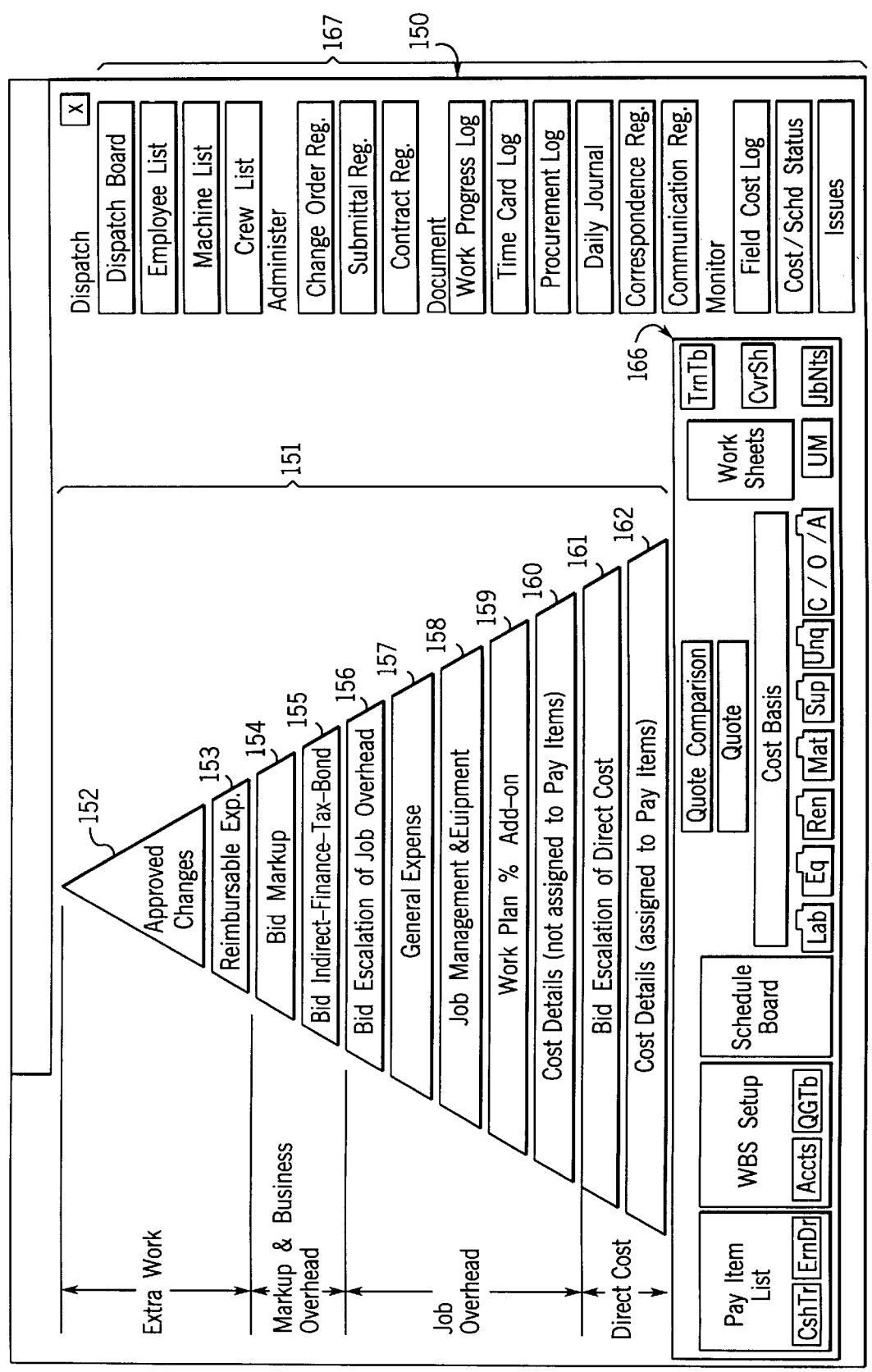
FIG. 22 is a pyramid navigation screen display for assisting the input, review and output of data for non-federal government projects for the project management module of FIG. 14.
Figure 23:
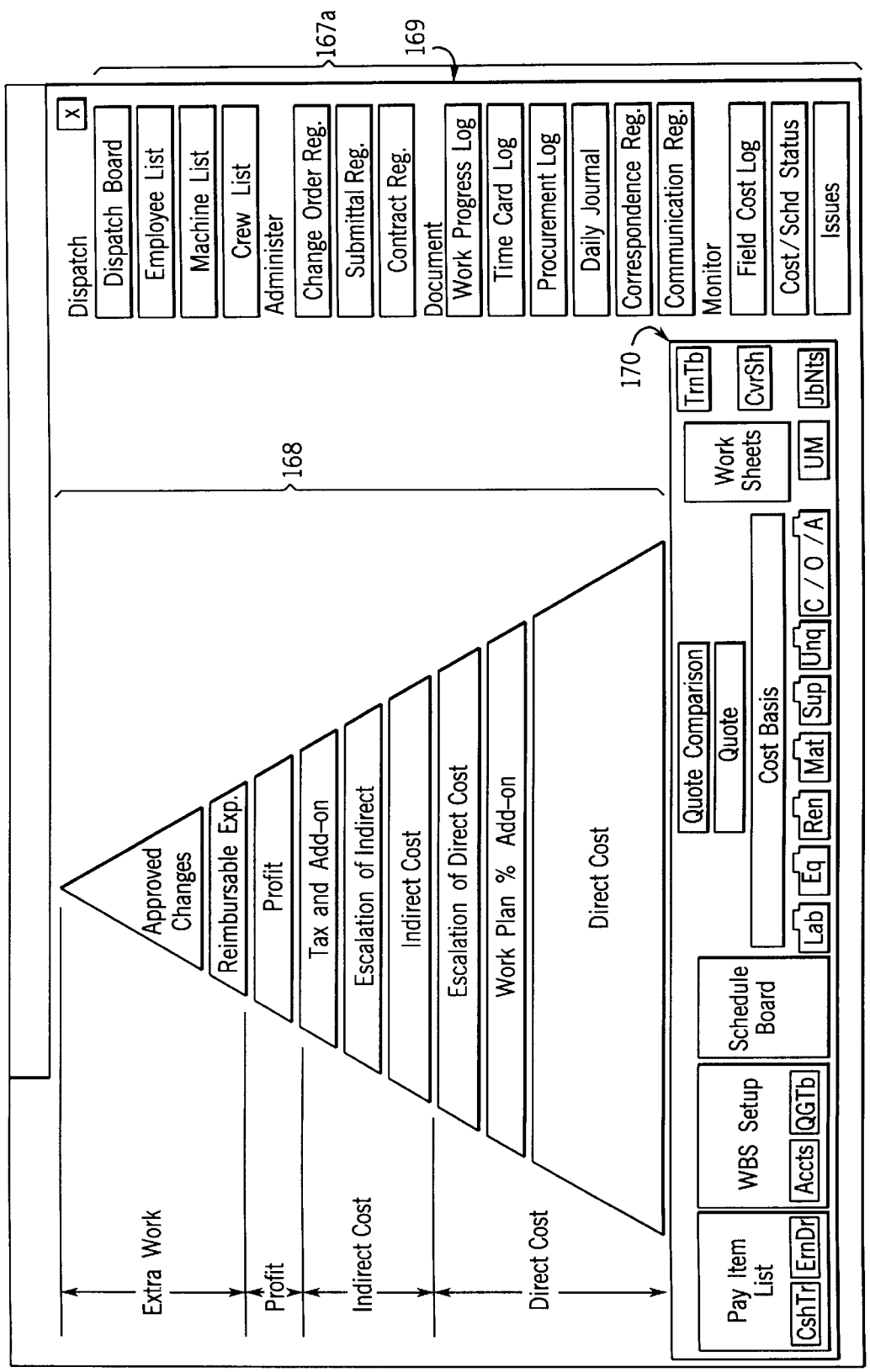
FIG. 23 is a pyramid navigation screen display for projects under the Federal Acquisition Regulation which can be selected as an alternative to FIG. 15.

By selecting button 145, a pyramid screen display 150, seen in FIG. 22 is displayed on the screen 18 of the computer monitor 16 in FIG. 1. This pyramid screen display 150 has a pyramid 151 with transverse segments, 152, 153, similar to the pyramid screen displays described earlier. This pyramid screen display 150 is particularly for managing projects for the private sector, or state or local government, but not for the federal government. The segments 154–162 are similar to the segments in the pyramid for the EOS™ module. Two new segments, 152, 153, have been added at the top to handle approved changes in work specifications and reimbursable expenses. The base 166 below the pyramid is the same as in FIG. 3 for accessing the same data as in FIG. 3. A row of output buttons 167 is provided on the right hand side of the display for handling an expanded number of screen displays. To assist in understanding the general functions of these screen displays, the labels on the buttons 167 in FIGS. 22 and 23 are defined as follows. The Dispatch Board (first button 167) is a list of activities to be engaged in by people and other resources. The Employee List (second button 167) is a list of employees who are available to be dispatched to work on the particular job. The Machine List (third button 167) is a list of machines that are available to be dispatched to work on the particular job. The Crew List (fourth button 167) is a list of the collection of people who are to engage in specific activities. The Change Order Register (fifth button 167) is a list of change order requests and proposals applicable to the project. The Submittal Register (sixth button 167) is a list of documents that must be submitted during a job. The Contract Register (seventh button 167) is a register of subcontracts.

The Work Progress Log (eighth button 167) is a form on which the quantity of work is recorded in terms of time and in which forecasts are made of time to complete various tasks remaining to be done on the job. The Time Card Log (ninth button 167) is a record of the actual hours of labor and equipment to accomplish an activity. The Procurement Log (tenth button 168) is a log of deliveries of resources needed for the job. The Daily Journal (eleventh button 167) is used to record observations about the job, including weather conditions, verbal orders, unusual events and notes of important conversations and meetings. The Correspondence Register (twelfth button 167) is a list incoming correspondence and to publish outgoing correspondence. The Communication Register (thirteenth button 167) is a list of meetings, calls and communications other than correspondence. The Field Cost Log (fourteenth button 167) is a log of labor, equipment and rental costs accrued using the work plan. The Cost Schedule Status (fifteenth button 167) is a report with the cost and schedule status of a job. The "Issues" button (sixteenth button 167) is executed to produce a report that collects all administrative issues from the above-mentioned registers and logs.

Referring to FIG. 23, another pyramid navigational structure 168 is provided on a screen display 169 for jobs to be managed under the Federal Acquisition Regulations (FAR) This option is selected when a job folder is set up to hold the proposal as an initial step in preparing a bid or proposal. When this option is selected a different pyramid appears as the pyramid navigation screen and different forms will appear in response to activating segments of the pyramid navigation screen display 169.

In the FAR pyramid display 169, the profit, indirect cost and cost segments are changed as described for the EOS™ module. In addition, for the PXS™ module segments are added at the top of the pyramid for approved changes and reimbursable expenses. In FIG. 23, the data foundation 170 contains the same data structures, as the pyramid structures seen in FIGS. 3, 4 and 15. The output buttons 167*a* on the screen display in FIG. 16 are also the same as seen in FIG. 15. Returning to FIG. 21, the user has the option of selecting another navigation aid from the command button bar 144. By selecting and executing the flow chart button 147, a screen display 181 as seen in FIG. 24 is displayed to the user to begin a flow chart sequence.

The flow chart that extends through FIGS. 24–34 is part of a multi-tab, multi-dialog panel structure 182 of a general type seen in Windows applications. It has, however, been customized for the present invention by selecting and arranging the categories for the tabs, defining the number of tabs and panels and most importantly, creating the flow chart displays. The tab 182 which is selected to show the screen display 174 is the "Setup" tab 172.

The first block 175 in screen display 174 is a folder block. It has a title bar 176 and sequence number 177. It is shown in white against a gray background to denote that it is active. When block 175 is selected and executed, a screen will come up for entering data to initiate a new job folder or open an existing job folder.

Figure 24:
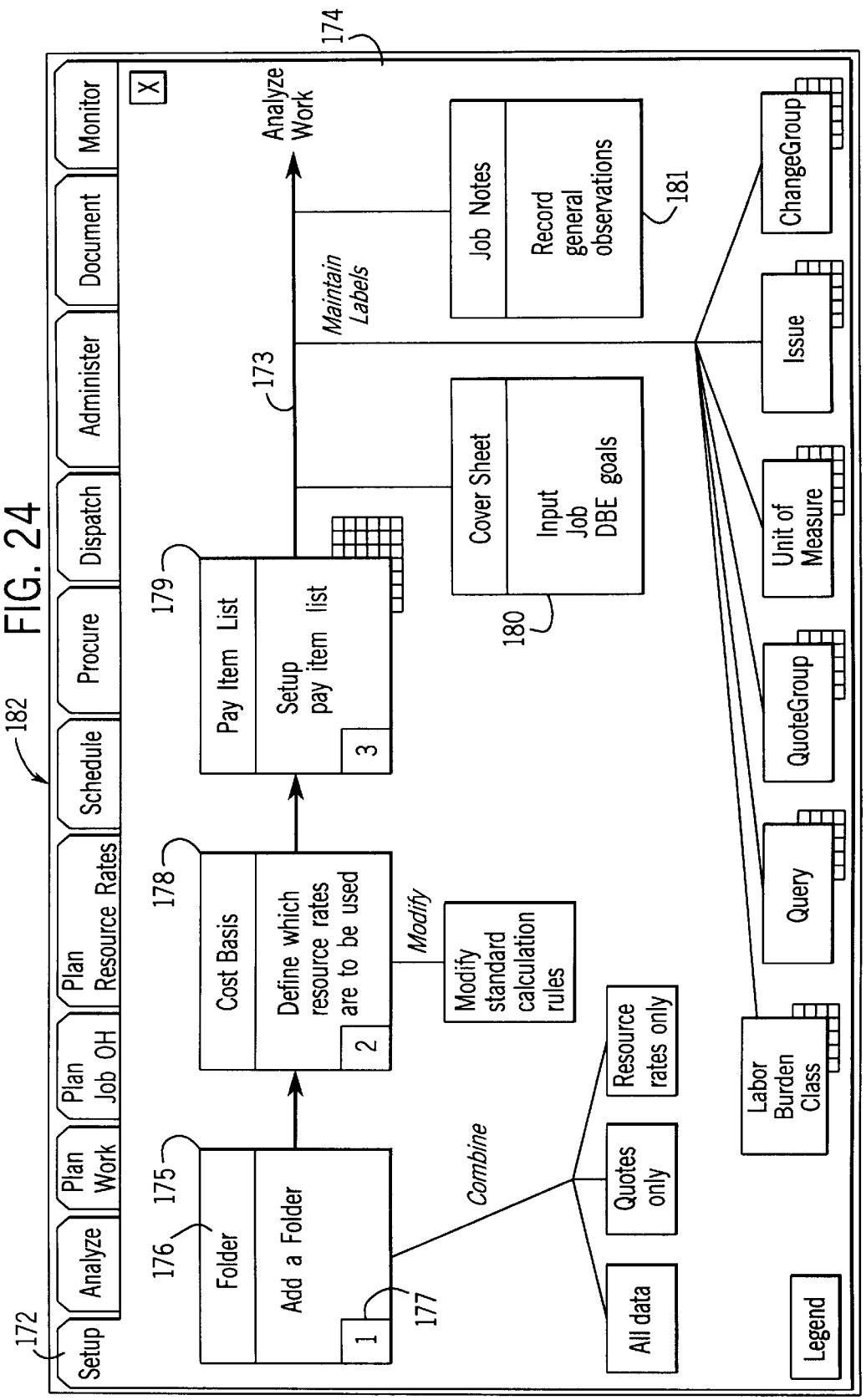
FIGS. 24–34 are a series of screen displays that form an alternative navigational flow chart through a series of detailed screen displays for managing non-federal government projects using the project management module of FIG. 14.

The second process block 178 in FIG. 24 is linked to the cost basis data structures similar to area 56, 56*a* in the pyramid navigation screen displays 30, 30*a*. The next process block 179 in FIG. 5 is linked to data structures similar to in a pay item list, rather than a bid item list. This is followed by process blocks 180 and 181 for the "cover sheet" and "job notes" similar to the EOS™ module. These blocks, however, do not carry a sequence number such as "1, 2 or 3," signifying that they are optional blocks. Blocks carrying the sequence numbers must normally be activated and their forms completed to complete a first bid or proposal using the Hard Dollar® program, or to manage a first project. After the first bid or proposal has been prepared, it is possible to shorten the process by copying files from a previous bid, proposal or project, and in that case, not all of the sequence number blocks will require the input of new data.

Figure 25:
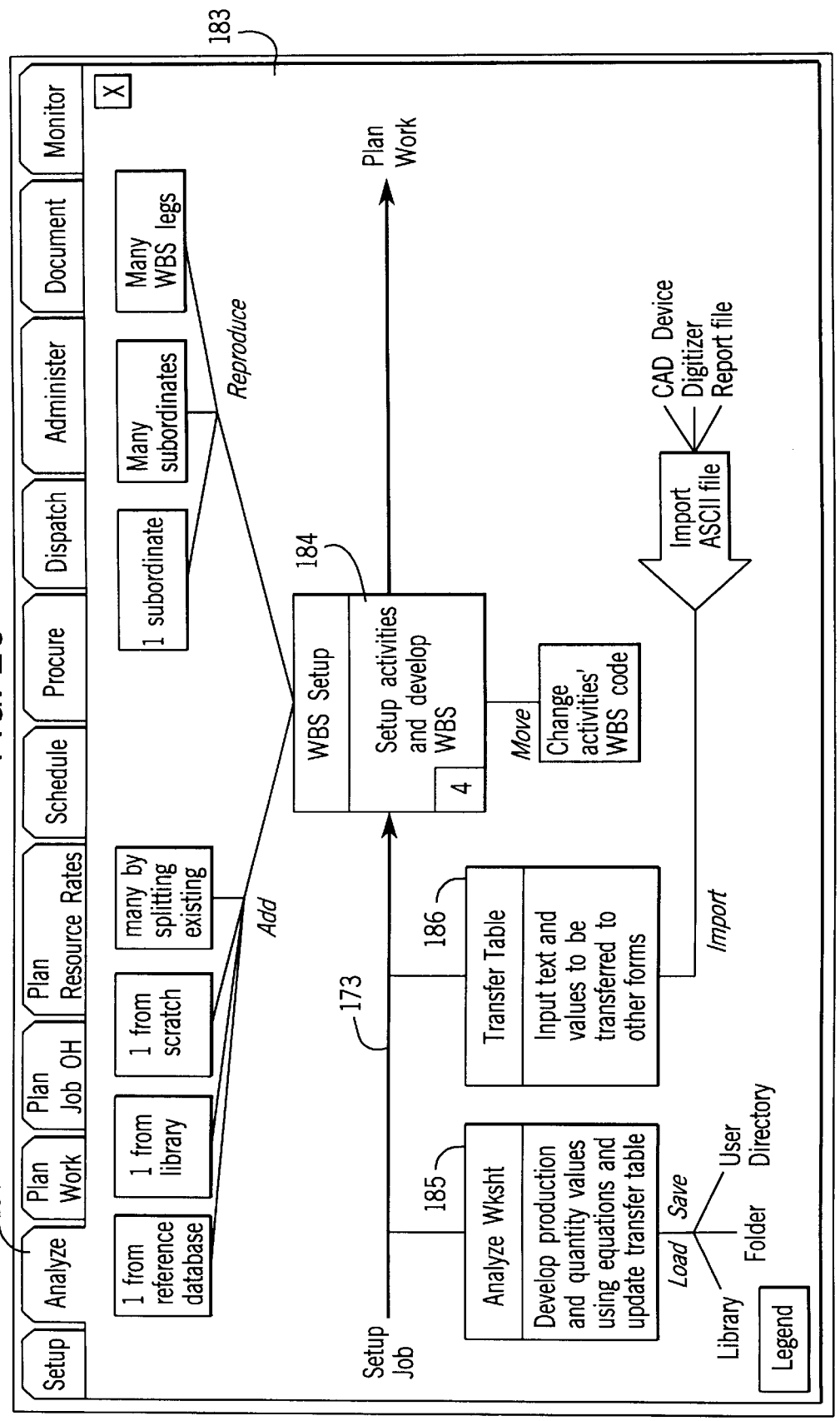

Referring next to FIG. 25, and a second screen display 183 in the series of FIGS. 24–34 is activated by selecting the next tab 184 for "Analyze." This screen includes process block 184 and optional process blocks 185 and 186.

Figure 26:
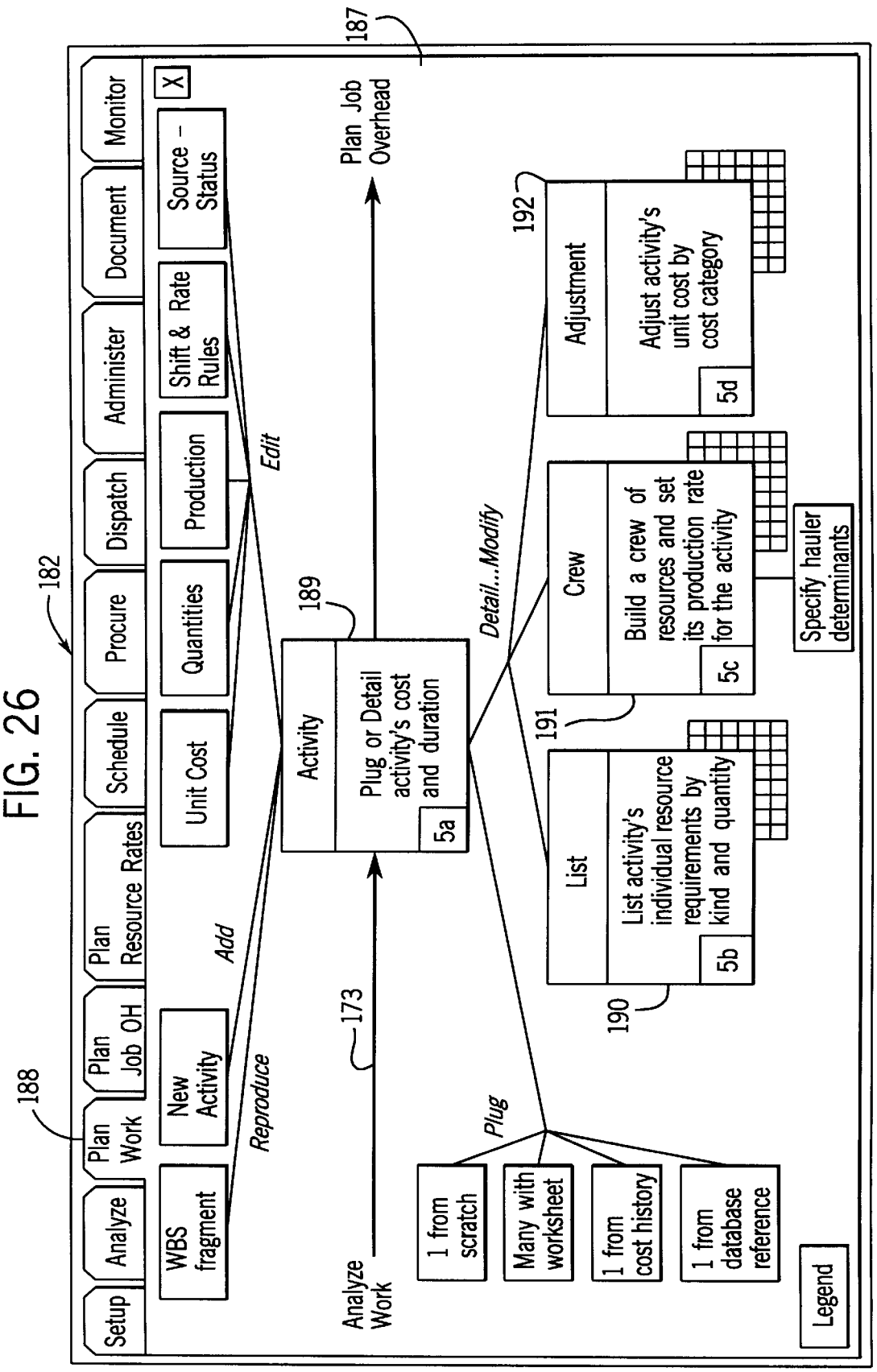

Referring next to FIG. 26, a third screen display 187 in the series of FIGS. 24–34 is activated by selecting the next tab 188 for "Plan Work." The next group of process blocks 189, 190, 191 and 192 are related through sequence numbers "5*a*", "5*b*", "5*c*" and "5*d*". Process block 189 relates to establishing "activities" in the Work Breakdown Structure. Process blocks 190, 191 and 192 contain details as to resources, crew and adjustments by cost category.

Figure 27:
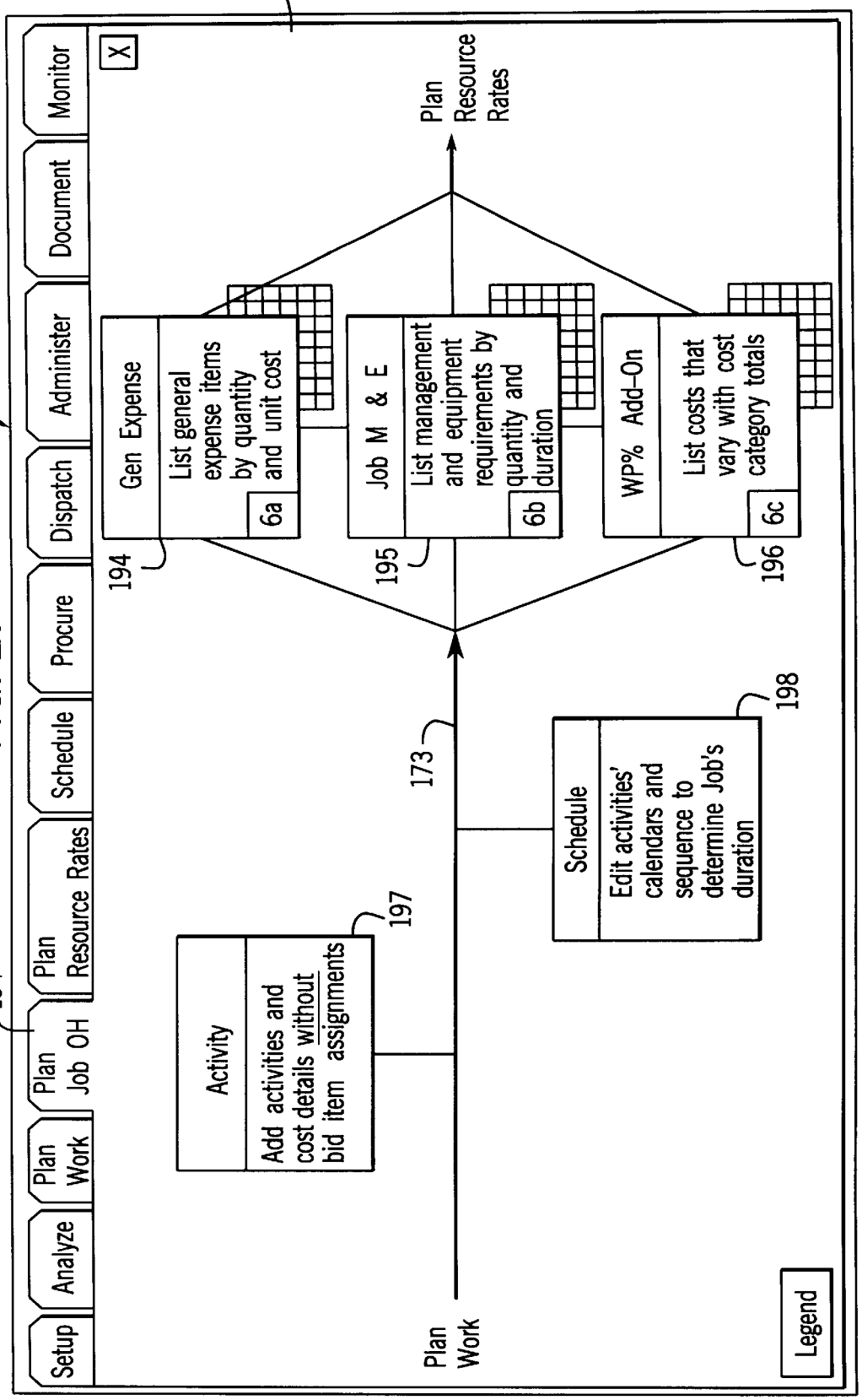

Referring next to FIG. 27, a fourth screen display 193 in the series of FIGS. 24–34 is activated by selecting the next tab 194 for "Plan Job Overhead." Process blocks 194, 195 and 196 displayed on this screen correspond to segments 157, 158 and 159 of the pyramid 151 in FIG. 22. Optional blocks 197, 198 in this screen 193 relate to activities without bid item assignments and to the schedule, respectively.

Figure 28:
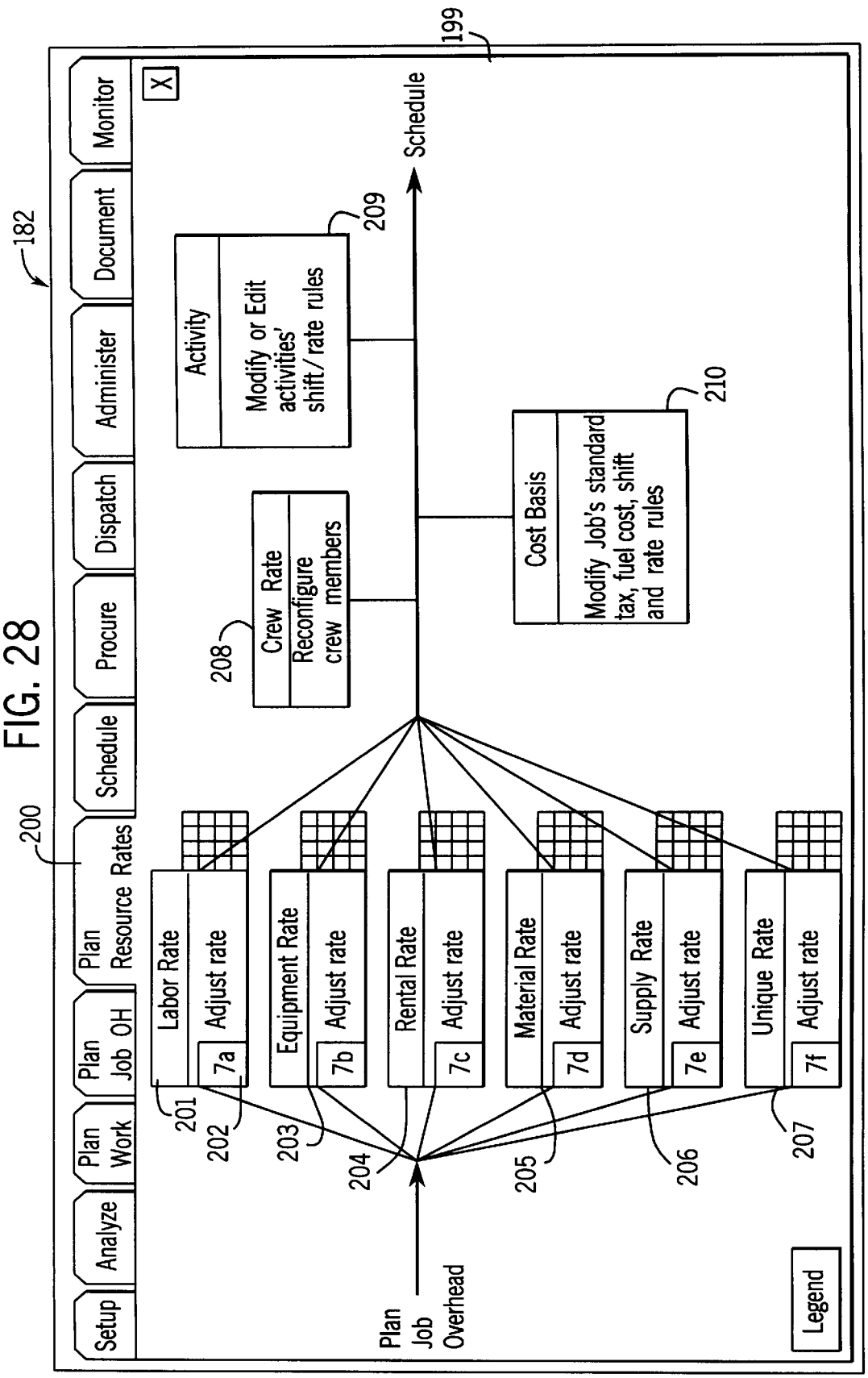

Referring next to FIG. 28, a fifth screen display 199 in the series of FIGS. 24–34 is activated by selecting the next tab 100 for "Plan Resource Rates." Process blocks 201–207 allow access to worksheets or forms for resource rates for labor, equipment, rentals, material, supply, unique rates and crew rates also accessed through folders in the base 166 of FIG. 22. Optional blocks 208, 209 and 210 in this screen 199 allow the user to adjust the cost basis.

Figure 29:
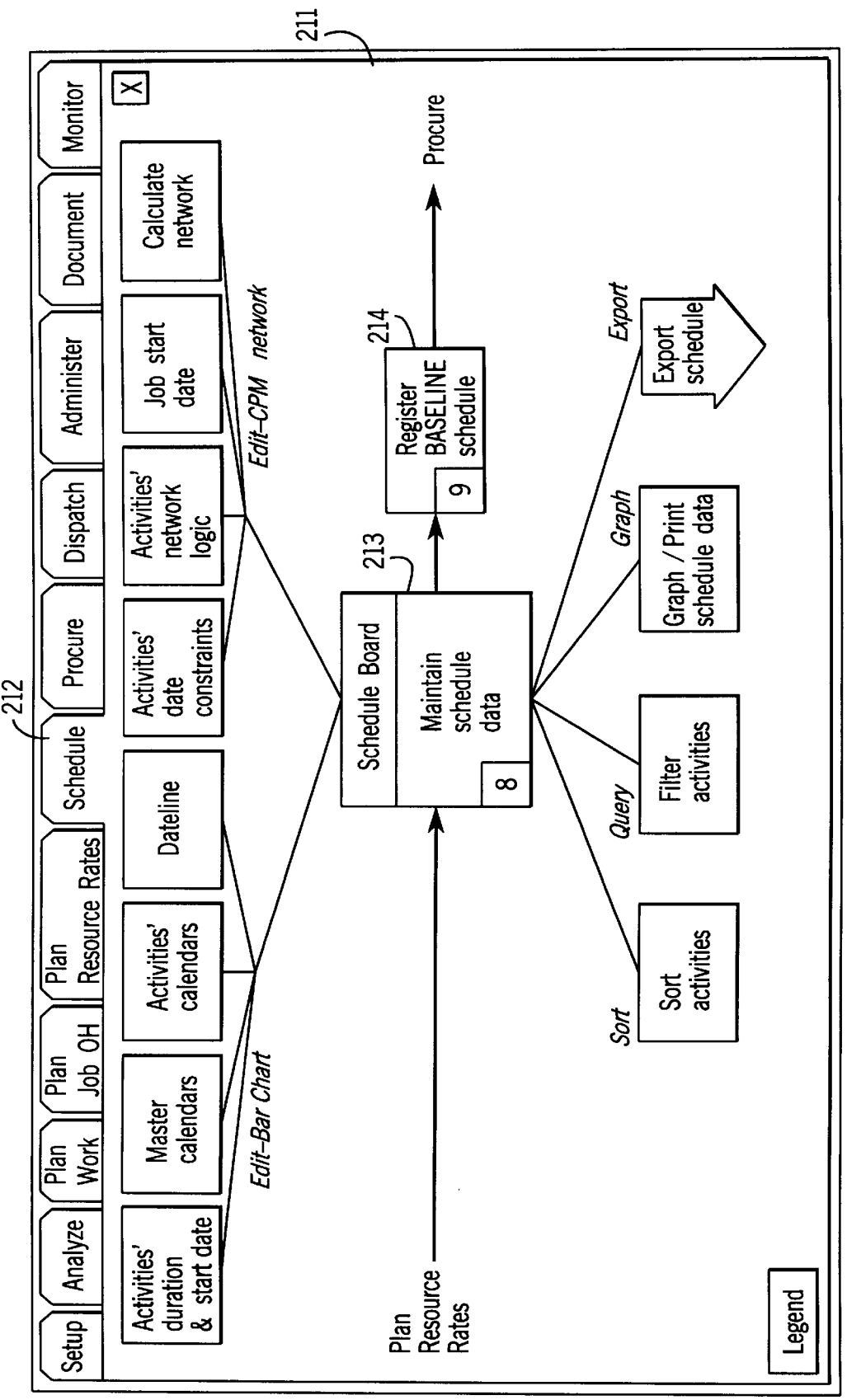

Referring next to FIG. 29, a sixth screen display 211 in the series of FIGS. 20–27 is activated by selecting the next tab 212 for "schedule." Process blocks 213, 214 with sequence numbers "8" and "9" relate to maintaining the schedule data and establishing a baseline schedule, respectively.

Figure 30:
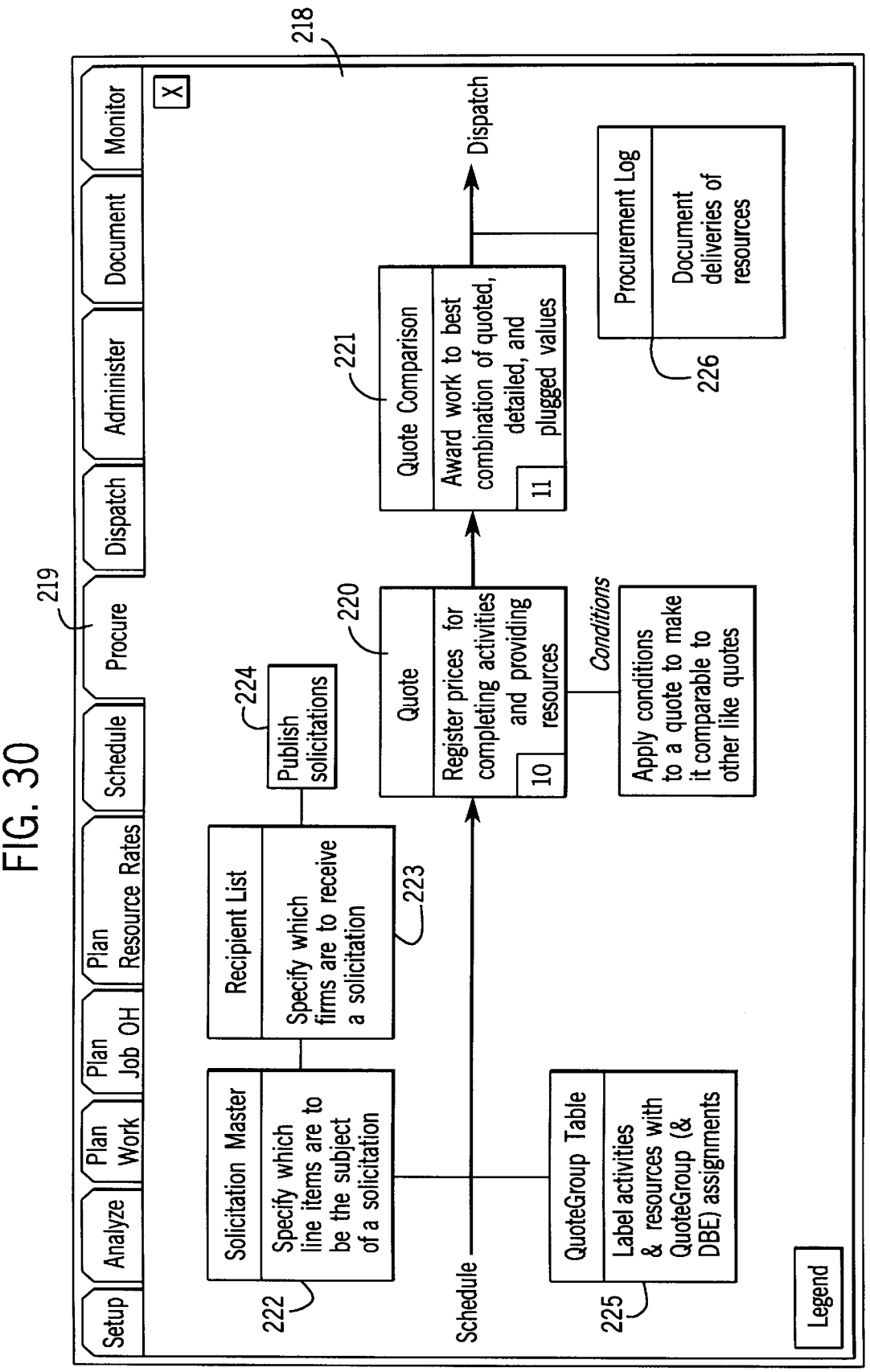

Referring next to FIG. 30, a seventh screen display 218 in the series of FIGS. 24–34 is activated by selecting the next tab 219 for "Procure." Process block 220 with sequence number "10" corresponds to the "Quote" data structure in FIGS. 22 and 23. The "Quote Comparison" process block 221 with sequence number "11" corresponds to the Quote Comparison data structure of FIGS. 22 and 23. Other process blocks 222, 223, 224, 225 and 226 correspond to areas in the pyramid and base in FIGS. 22 and 23 to assist the procurement process.

Figure 31:
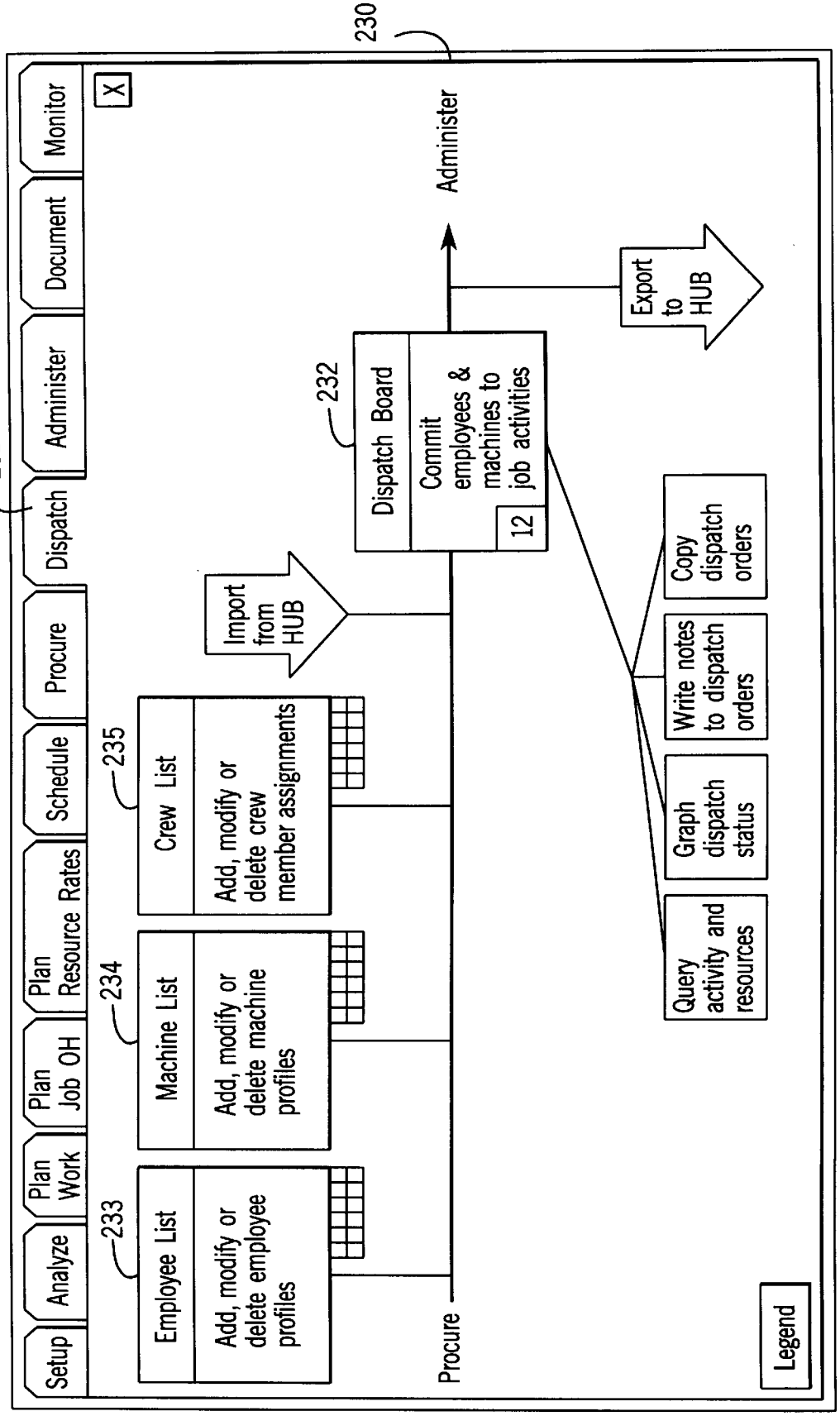
Figure 32:
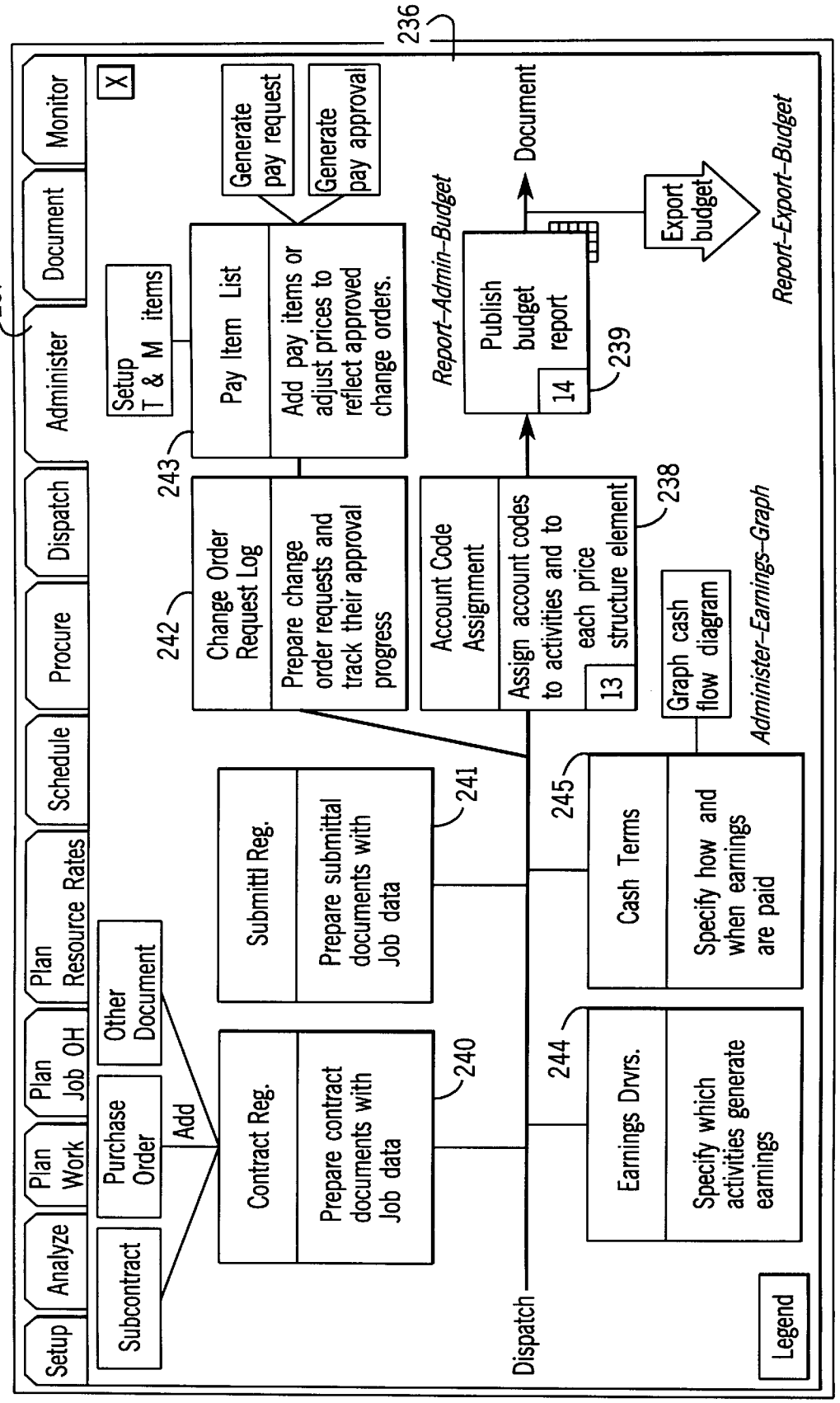

Referring next to FIG. 31, an eighth screen display 230 in the series of FIGS. 24–34 is activated by selecting the next tab 231 for "Dispatch." Process block 232 with sequence number "12" corresponds to a dispatch board screen display. Optional process blocks 233, 234 and 235 are available to access the employee list, the machine list and the crew list.

A ninth screen display 236 in a series of FIGS. 24–34 is activated by selecting the next tab 237 for "Administer." Process block 238 is selected to assign account codes to activities and to each price structure element. Process block 239 is an optional process block for publishing a budget report. Other optional process blocks 240–245 are provided for accessing structures similar to those accessed in the base 166, 170 of the pyramid in FIGS. 22 and 23.

Figure 33:
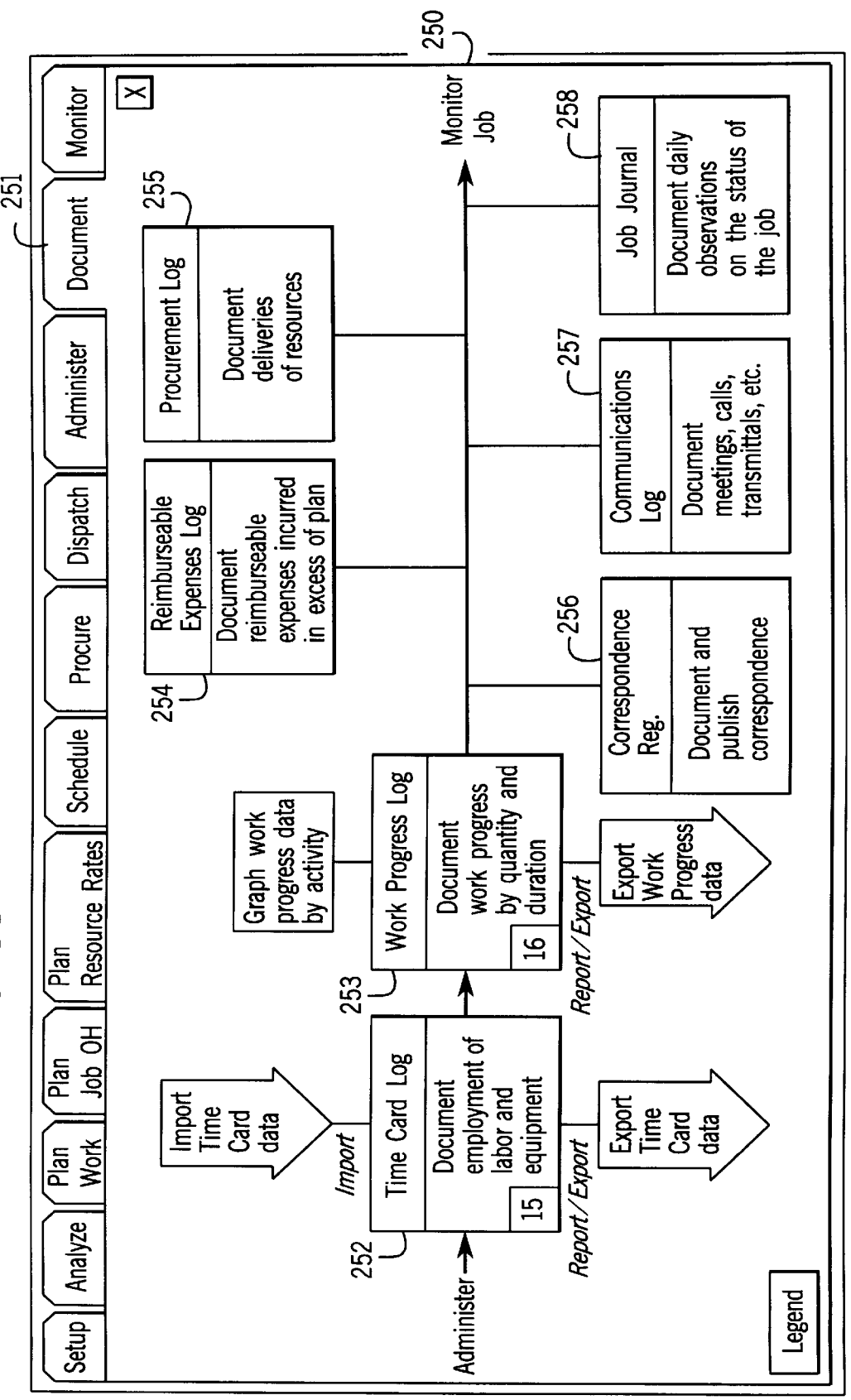

Referring to FIG. 33, a tenth screen display 250 in the series of FIGS. 24–34 is activated by selecting the next tab 251 for "Document." Process block 252 with sequence number "15" is selected to enter data in a time card log to document the employment of labor and equipment. Process block 253 is selected to enter quotes in a work progress log. Optional process blocks 254–258 are provided for quoting reimbursable disbursements, deliveries of resources, correspondence, communications and daily job notes.

Figure 34:
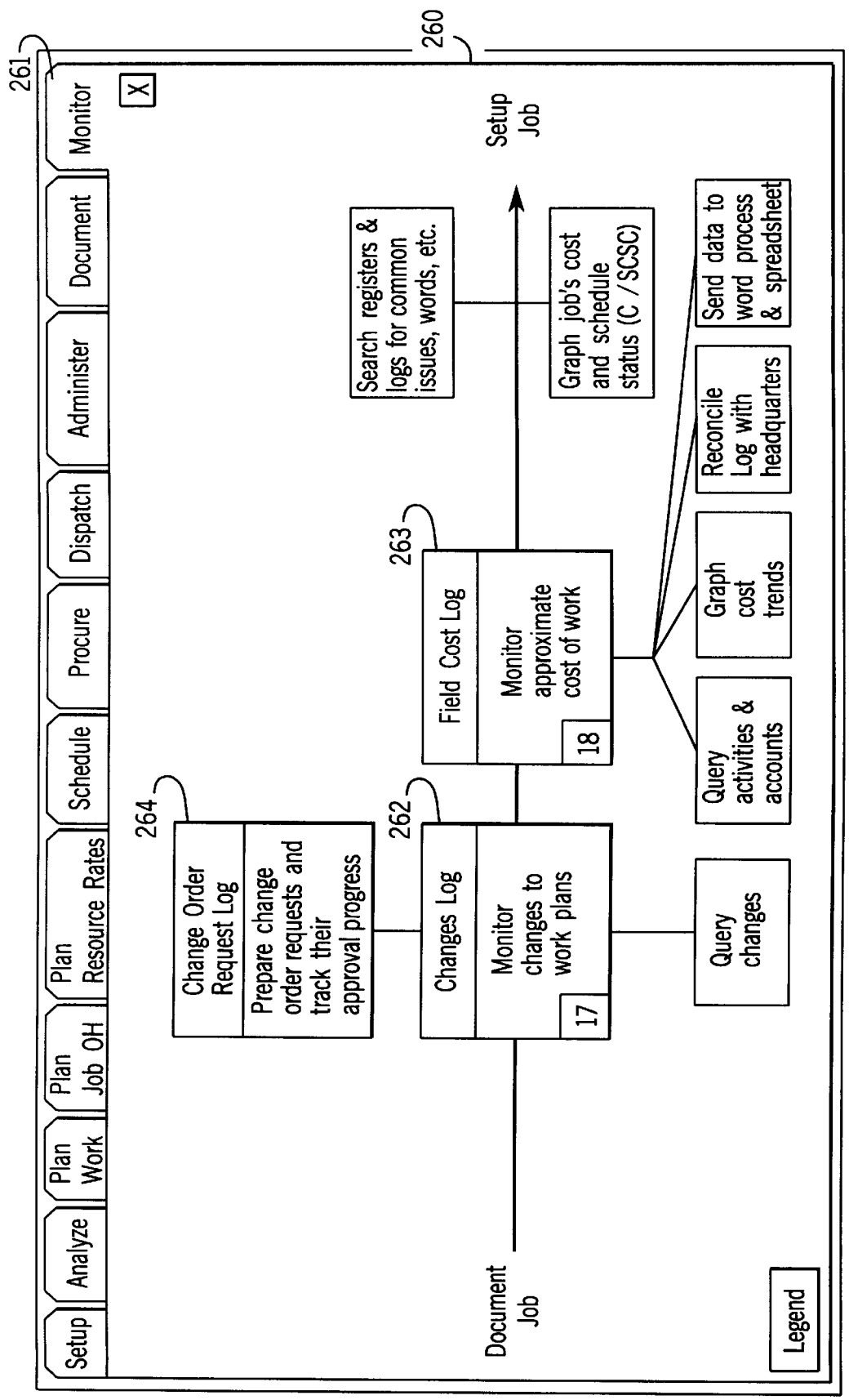

Referring finally to FIG. 34, the last in the series of screen displays in the series of FIGS. 24–34, the screen display 260 is activated by selecting the tab 261 for "Monitor." Process block 262 with sequence number "17" is selected to monitor changes to work plans. Process block 263 is selected to access the detailed screen display for monitoring the approximate cost of the work. An optional process block 264 is provided for entering change order requests and tracking their approval progress.

The above description shows a logical flow for tracking items connected with project management. By selecting the various sequence process blocks, the user accesses the detailed screen displays for carrying out project management.

This has been a detailed description of various examples of how the invention can be carried out. Those of ordinary skill in the art will recognize that the various details may be modified in arriving at other detailed embodiments, in that these embodiments will come within the scope of the invention.

Therefore, to apprise the public of the scope of the invention and the embodiments covered by the invention, the following claims are made.

We claim:

1. A method of operating a computer, said method comprising displaying a data navigation device in at least one screen display, said data navigation device having a plurality of segments, said segments being displayed and being selectable by corresponding user inputs to cause further displays of corresponding forms, said forms including forms having a plurality of data fields, including fields for entry of numerical data and calculated fields for calculating subtotals from said numerical data; and wherein said data navigation device displays said segments in an ordered sequence to assist a user in entering data which are used for estimating or managing a financial estimate.

2. The method of claim 1, wherein said segments within said data navigation device are associated in groups on the screen, and wherein said groups correspond to portions of a financial estimate.

3. The method of claim 2, wherein said screen display including said data navigation device includes totals displayable on the screen in correspondence to the groups of segments corresponding to parts of the financial estimate.

4. The method of claim 1, wherein said data navigation device is displayed as one side of a pyramid having a plurality of transversely extending segments representing the parts of the financial estimate.

5. The method of claim 4, wherein said screen display including said data navigation device further includes a base which is displayed below said pyramid, and wherein said base has a plurality of active areas which can be activated to display data which is used to derive values for use in the forms accessed through the segments of the pyramid.

6. The method of claim 4, further comprising the step of displaying buttons by which reports can be generated without accessing the segments of the pyramid.

7. The method of claim 1, further comprising the step of displaying a button bar having a button image responsive to one or more user inputs to select and display said data navigation device.

8. The method of claim 1, wherein said data navigation device is in a form of a flow chart formed by a plurality of screen displays having process blocks representing the parts of the financial estimate.

9. The method of claim 8, wherein said process blocks each have a title bar and a sequence number to aid the user in navigating through the forms.

10. A stored computer program contained in a storage medium to be read by a processor for causing a computer to operate according to portions of program code contained in the storage medium, the stored computer program comprising:

a first portion of program code stored in a storage medium for causing display of any one of a plurality of forms having a plurality of data fields, including forms having fields for entry of numerical data and calculated fields for calculating subtotals from said numerical data as part of a financial estimate;

a second portion of program code stored in said storage medium for displaying a screen display having a data navigation device with a plurality of segments corresponding to the respective forms, wherein said data navigation device displays said segments in an ordered sequence to assist the user in entering data which are used for estimating or managing a financial estimate; and a third portion of program code stored in said storage medium and responsive to user selection of one of the segments of said data navigation device to cause display of a selected one of said forms for preparing or managing at least a portion of a financial estimate.

11. The stored computer program of claim 10, wherein said segments within said data navigation device are associated in groups on the screen, and wherein said groups of segments correspond to parts of the financial estimate.

12. The stored computer program of claim 11, wherein said screen display with said data navigation device is further capable of display of totals for the respective groups of segments corresponding to respective parts of the financial estimate.

13. The stored computer program of claim 10, wherein said data navigation device is displayed as one side of a pyramid having a plurality of transversely extending segments representing the parts of said financial estimate.

14. The stored computer program of claim 10, wherein said data navigation device further includes a base which is displayed below said pyramid, wherein said base has a plurality of active areas which can be activated to display data which is used to derive values for use in the forms accessed through the segments of the pyramid.

15. The stored computer program of claim 10, further comprising a fifth portion of program code stored in the operational medium for displaying a button bar having a button image responsive to one or more user inputs to select and display said data navigation device as one side of a pyramid having a plurality of transversely extending segments representing the parts of a financial estimate.

16. The stored computer program of claim 10, further comprising a sixth portion of program code for displaying buttons which can be selected by user inputs to generate reports without selecting the segments of the pyramid.

17. The stored computer program of claim 10, wherein said data navigation device is displayed as a flow chart formed by a plurality of screen displays having process blocks representing the parts of the financial estimate.

18. The stored computer program of claim 17, wherein a plurality of said process blocks each have a title bar and a sequence number to aid the user in navigating through the forms.

* * * * *